US010580331B2

(12) United States Patent
Veazie, IV

(10) Patent No.: US 10,580,331 B2
(45) Date of Patent: *Mar. 3, 2020

(54) FREESTANDING EXHIBIT DISPLAY

(71) Applicant: Waldemar Veazie, IV, Carmel, IN (US)

(72) Inventor: Waldemar Veazie, IV, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,426

(22) Filed: Apr. 17, 2019

(65) Prior Publication Data

US 2019/0244552 A1 Aug. 8, 2019

Related U.S. Application Data

(63) Continuation of application No. 15/783,438, filed on Oct. 13, 2017.

(60) Provisional application No. 62/438,176, filed on Dec. 22, 2016.

(51) Int. Cl.

| | |
|---|---|
| ***G06F 17/00*** | (2019.01) |
| ***G09F 17/00*** | (2006.01) |
| ***G09F 13/02*** | (2006.01) |
| ***G09F 11/08*** | (2006.01) |
| ***G09F 15/00*** | (2006.01) |

(52) U.S. Cl.

CPC .............. *G09F 17/00* (2013.01); *G09F 11/08* (2013.01); *G09F 13/02* (2013.01); *G09F 15/0056* (2013.01); *G09F 15/0062* (2013.01); *G09F 2017/0025* (2013.01); *G09F 2017/0041* (2013.01)

(58) Field of Classification Search

CPC .. G09F 11/08; G09F 15/0056; G09F 15/0062; G09F 2017/0041; G09F 2017/0025

See application file for complete search history.

(56) References Cited

U.S. PATENT DOCUMENTS

| | | | | |
|---|---|---|---|---|
| 4,406,519 A * | 9/1983 | Shaw | G03B 21/58 | 160/328 |
| 6,115,951 A * | 9/2000 | Jing | B60Q 7/00 | 40/610 |
| 6,996,929 B1 * | 2/2006 | Greene, Jr. | G09F 7/22 | 160/368.1 |
| 8,164,483 B1 * | 4/2012 | Phillips | E01F 9/681 | 116/63 P |
| 2011/0010974 A1 * | 1/2011 | White | F21V 21/06 | 40/606.02 |

* cited by examiner

*Primary Examiner* — Kristina N Junge

(74) *Attorney, Agent, or Firm* — Maginot, Moor & Beck LLP

(57) ABSTRACT

A freestanding exhibit display for supporting a banner includes a base, an upright support structure, and a transverse support arm. The upright support structure extends from the base. The transverse support arm is mounted on the upright support structure and includes a cradle defining a cradle space. The cradle is configured to retain a furled portion of the banner in the cradle space with only gravity.

20 Claims, 23 Drawing Sheets

FREESTANDING EXHIBIT DISPLAY

This application is a continuation of U.S. application Ser. No. 15/783,438, filed on Oct. 13, 2017, which in turn claims the benefit of priority to U.S. provisional application Ser. No. 62/438,176, filed on Dec. 22, 2016, the disclosures of which are incorporated herein by reference in their entirety.

FIELD

The disclosure relates to exhibit displays and, in particular, to freestanding exhibit displays for displaying exhibits and supporting light fixtures.

BACKGROUND

Exhibit displays, such as pipe and drape kits, tensioned fabric units, banner stands, and inflatable screens, are used by performance and religious groups to display drapes, curtains, banners, and other exhibits during performances and ceremonies. Moreover, some exhibit displays are also used to block backstage elements from audience view or to function as a reflective display screen onto which artwork or information is projected. Other exhibit displays are used in convention halls during tradeshow or during corporate gatherings. Additionally, exhibit displays are used as static or dynamic backdrops during rally events such as school pep rallies and political rallies.

The pipe and drape kit is a common exhibit display, which includes a scaffolding structure and a specialized drape. The scaffolding structure typically includes a base and a frame extending upward from the base. The base is placed on the ground and includes support posts for receiving and supporting the frame. The frame is secured to the support posts and typically includes stiles and rails connected with brackets or other fastening members. The frame is often rectangular in shape and defines an outer perimeter of the exhibit display. The drape is secured to the frame for display.

Erecting a pipe and drape kit is typically accomplished by one person when the height and width of the pipe and drape kit are less than about eight feet. In particular, when the pipe and drape kit is less than eight feet in height and width (i.e. a small-scale pipe and drape kit), the kit is typically freestanding and easily positionable by one person. That is, the small-scale pipe and drape kit has no connection or anchor to the structure of the facility in which it is located. When, however, the pipe and drape kit exceeds eight feet in height or width (i.e. a large-scale pipe and drape kit), then erection of the pipe and drape kit becomes more complicated and time consuming. Specifically, anchors or supports are required to stabilize a large-scale pipe and drape kit to prevent the kit from tipping over. The anchors or supports are connected to sturdy portions of the facility, such as ceiling joists, wall joists, and other anchor points. When a pipe and drape kit is anchored to the facility, the kit is no longer "freestanding."

As a result of the anchoring required by large-scale pipe and drape kits (i.e. over eight feet in height or width), the preparation and erection of the kit typically requires at least two people. Moreover, ladders, aerial lifts, and/or scaffolding are typically required to elevate the setup personnel at least to the height of the anchor points, thereby increasing the equipment and the time required to erect the pipe and drape kit. Still further, even if the equipment and crew for erecting a large-scale pipe and drape kit are available, many facilities prohibit any type of anchoring to the structure of the facility, such that only small-scale pipe and drape kits may be erected.

For at least these reasons, further developments in the area of freestanding exhibit displays are desirable.

SUMMARY

According to an exemplary embodiment of the disclosure, a freestanding exhibit display for supporting a banner includes a base, an upright support structure, and a transverse support arm. The upright support structure extends from the base. The transverse support arm is mounted on the upright support structure and includes a cradle defining a cradle space. The cradle is configured to retain a furled portion of the banner in the cradle space with only gravity.

According to another exemplary embodiment of the disclosure, a freestanding exhibit display for supporting a banner includes a base, an upright support structure, and a transverse support arm. The upright support structure extends from the base. The transverse support arm is mounted on the upright support structure and includes a cradle defining a cradle space. The cradle is configured to inhibit a center of mass of a furled portion of the banner from moving to a position that causes the furled portion to exit the cradle space during unfurling of the banner. The freestanding exhibit display is completely disconnected from the furled portion of the banner, such that the furled portion is freely removable from the cradle space.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

Figure 1:
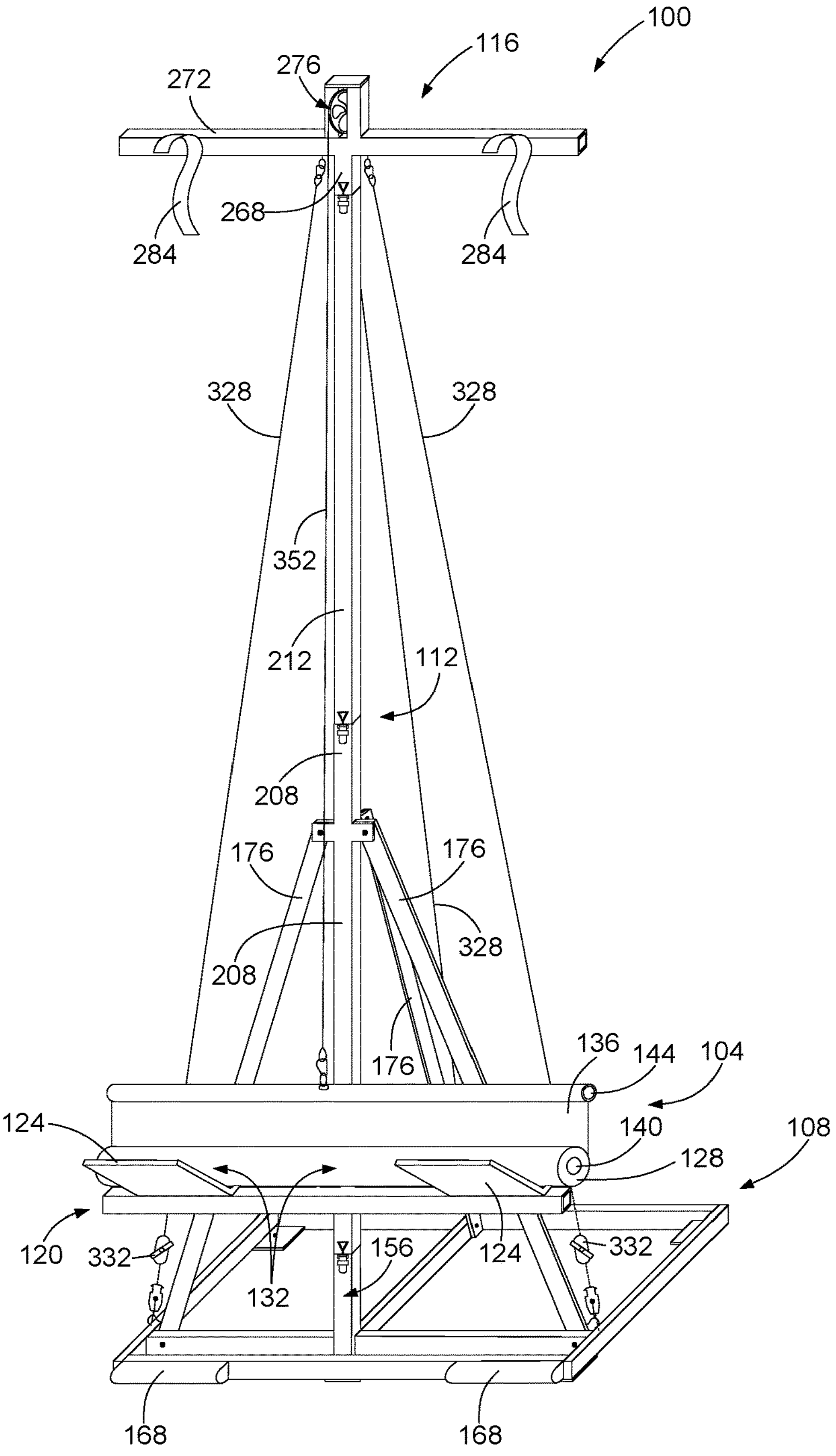
FIG. 1 is a perspective view of a freestanding exhibit display, as disclosed herein, and a banner which is substantially furled and resting on a cradle of the freestanding exhibit display.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

As shown in FIG. 1, a freestanding exhibit display 100 for supporting and displaying at least one banner 104 includes a base 108, an upright support structure 112, an upper transverse support structure 116, and a lower transverse support structure 120 having a cradle 124. The banner 104 includes a furled portion 128 that is supported by the cradle 124, but is not connected to the cradle 124 or to any other portion of the freestanding exhibit display 100. The cradle 124 is configured to retain the furled portion 128 of the banner 104 in a cradle space 132 of the cradle 124 with only gravity during unfurling of the banner 104. Moreover, the exhibit display 100 is easily erectable to heights of about forty feet without requiring any type of anchoring to the facility (not shown) and without requiring an aerial personnel lift or scaffolding. Thus, the freestanding exhibit display 100 is configured to enable a user to prepare quickly and easily the banner 104 for display.

The term "banner," as used herein, includes any type of display including, but not limited to, projection screens, video screens, banner displays, drapes, cloths, and sails. Moreover, the banner 104, in some embodiments, is one section of a multi-section banner. The banner 104 may have a length (i.e. height) of up to about forty feet and a width of up to about five feet.

The exemplary banner 104 includes the furled portion 128 and an unfurled portion 136. The furled portion 128, in one embodiment, is a portion of the banner 104 that is wound up or rolled up. In one embodiment, the furled portion 128 is wound around a core 140, which inhibits bending of the furled portion 128. In another embodiment, the furled portion 128 is self-supported and does not include the core 140. That is, the furled portion 128 is rolled up without any type of core 140 in the center. When the banner 104 is configured for storage, the furled portion 128 includes most, or all, of the banner 104. When the banner 104 is configured for display, the furled portion 128 typically includes only a small portion of the banner 104, such as less than 5% of the total length of the banner 104. Some banner applications (such as advertising banners) are not furled at all and do not include the core 140.

The unfurled portion 136 extends from the furled portion 128 and is configured for display by the freestanding exhibit display 100. To support the unfurled portion 136, an end of the banner 104 is connected to a rigid support rod 144. The support rod 144 is connected directly to the exhibit display 100. The unfurled portion 136 is unrolled from the furled portion 128 and is configured in a planar configuration by the weight of the furled portion 128 pulling down against the support rod 144.

Figure 2:
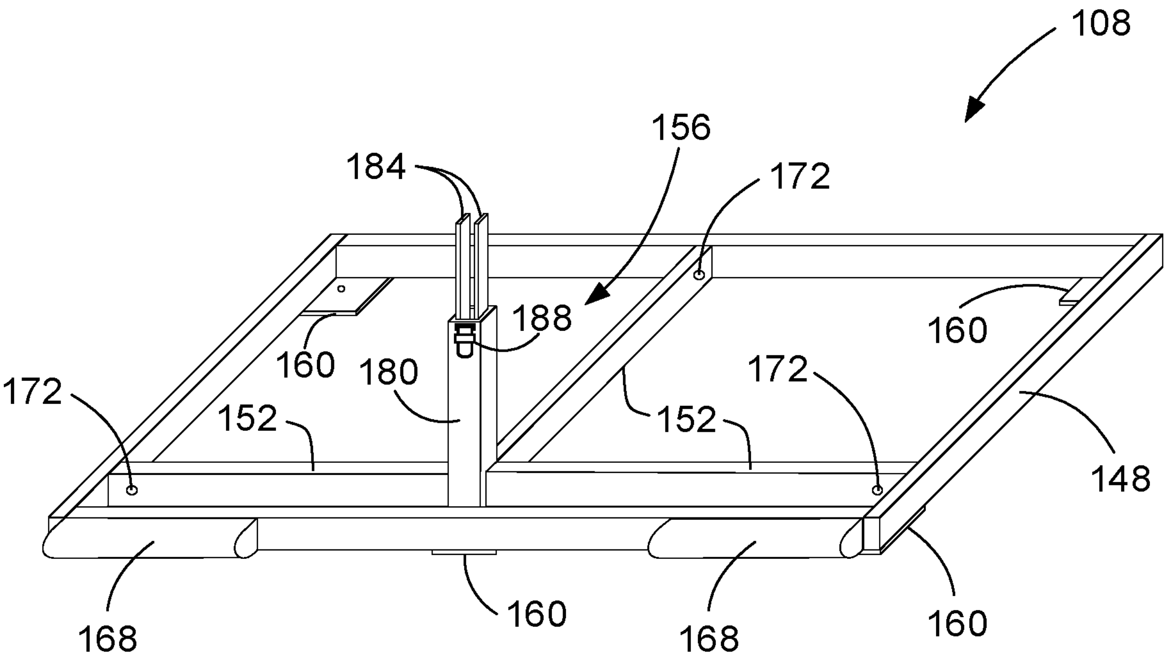
FIG. 2 is a perspective view of a base of the freestanding exhibit display of FIG. 1.

With reference to FIG. 2, the base 108 includes a rectangular frame 148, cross members 152, a vertical support member 156, mounting plates 160, casters 164 (FIGS. 4 and 5), and bumpers 168. The frame 148 is configured for placement on a flat support surface, such as the ground, the floor, or a stage. The frame 148 defines an area that is large enough to inhibit tipping of the exhibit display 100 in response to forces exerted on the upright support structure 112 and the banner 104. In other embodiments, the frame 148 is square, triangular, or any other desired shape that is configured to support the upright support structure 112 and the corresponding banner(s) 104.

Figure 8:
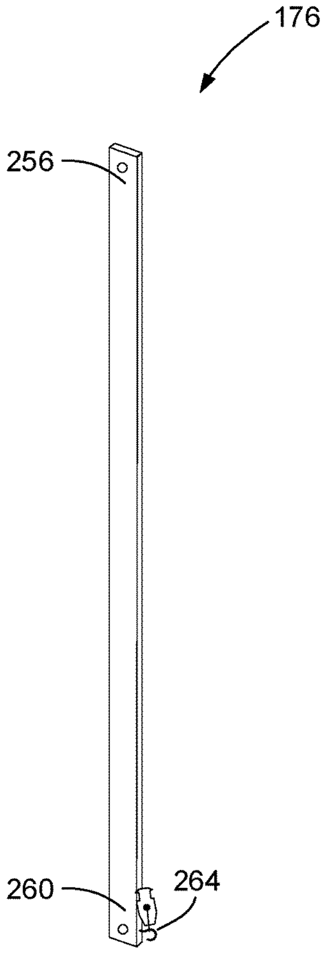
FIG. 8 is an outrigger of the freestanding exhibit display of FIG. 1.

The base 108 is shown in FIG. 2 as including three of the cross members 152, which are connected to the rectangular frame 148 and the vertical support member 156. The cross members 152 are configured to maintain the vertical support member 156 in a fixed position relative to the rectangular frame 148. Each cross member 152 defines an outrigger support opening 172 configured to connect to a corresponding outrigger 176 (FIG. 8). In other embodiments, the base 108 includes any suitable number of the cross members 152.

Figure 3:
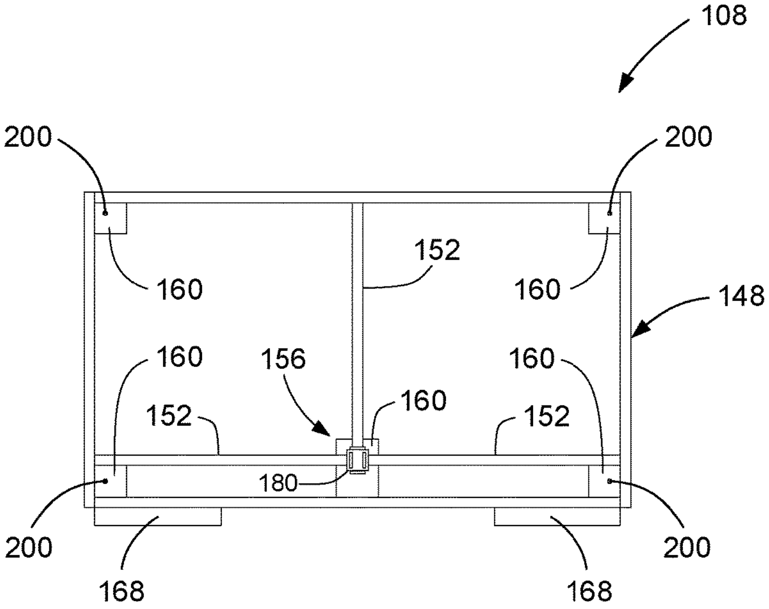
FIG. 3 is a top plan view of the base of FIG. 2.
Figure 4:
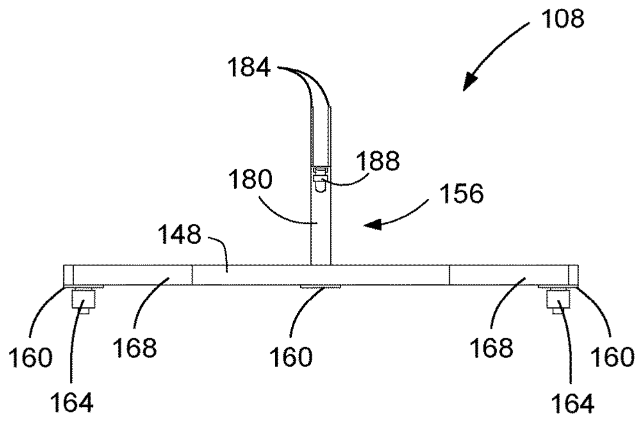
FIG. 4 is a front elevational view of the base of FIG. 2.
Figure 5:
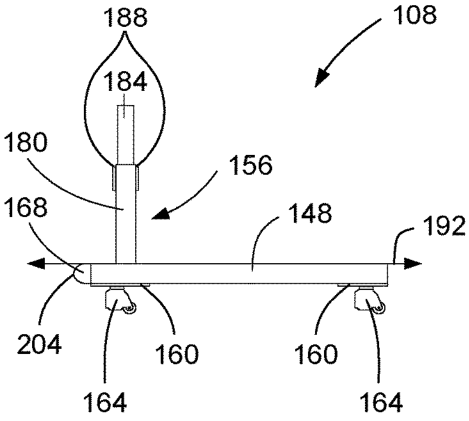
FIG. 5 is a side elevational view of the base of FIG. 2.

As shown in FIGS. 3-5, the vertical support member 156 includes a post portion 180, connecting tangs 184, and a toggle clamp 188. The post portion 180 is fixedly connected to the cross members 152 and extends vertically away from a plane 192 (FIG. 5) defined by the frame 148.

The connecting tangs 184 extend upward from the post portion 180, away from the frame 148 and the plane 192, by about six inches, in one embodiment. The connecting tangs 184 are formed from flat bars welded or otherwise connected inside of the post portion 180. The connecting tangs 184 are configured to receive and to support the upright support structure 112 (FIG. 1). The vertical support member 156 includes two of the connecting tangs 184, but in other embodiments, may include any suitable number of the connecting tangs 184, such as from one to four.

The toggle clamp 188 of the vertical support member 156 is connected to the post portion 180 and is configured to engage a corresponding toggle clamp catch 196 (FIG. 6) of the upright support structure 112 to connect the upright support structure 112 to the base 108.

The frame 148, the cross members 152, and the post portion 180 are formed, in one embodiment, from stock angles and channels generally having a 0.125 inch wall thickness. For example, 1"×2" aluminum channel is used to form the rectangular frame 148 and the cross members 152, and 2"×2" aluminum channel is used to form the post portion 180. Thus, base 108 is strong, rigid, and relatively light, thereby making the base 108 easily transportable by one person, as compared to known exhibit displays. In other embodiments, any suitably strong and rigid material may be used to form the base 108, such as steel or wood. In one particular embodiment, the base 108 is formed from steel tubing or pipe.

With reference to FIG. 3-5, the mounting plates 160 (FIG. 3) and the casters 164 (FIGS. 4 and 5) are connected to the rectangular frame 148 of the base 108. The mounting plates 160 are connected directly to the frame 148 and are configured make the frame 148 even more rigid. The mounting plate 160 located under the vertical support member 156 is connected to the post portion 180, the frame 148, and the cross members 152 and is configured to inhibit movement of the post portion 180 relative to the frame 148. The mounting plates 160 located at the corners of the frame 148 define mounting openings 200 (FIG. 3) for receiving a respective one of the casters 164.

The casters 164 are connected to the mounting plates 160 through the mounting openings 200. The casters 164 are located at corners of the frame 148 and are configured to enable easy rolling movement of the base 108 by as few as one person, thereby making the exhibit display 100 fast and simple to position during intermission of a stage production, for example. At least one of the casters 164 includes a braking structure (not shown) to hold the exhibit display 100 in a desired location and to inhibit undesired movement of the exhibit display 100. The casters 164, in some embodiments, are threadingly adjustable within the mounting openings 200 to enable leveling of the frame 148 when the base 108 is placed on an uneven surface. The casters 164 in some embodiments are leveling casters.

Figure 14:
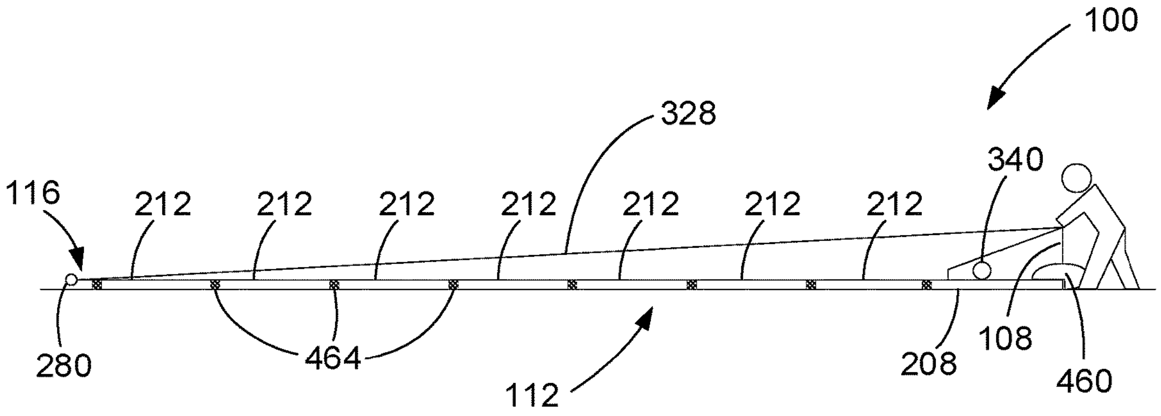
FIG. 14 is a side elevational view of the freestanding exhibit display of FIG. 1 in a flat position.
Figure 15:
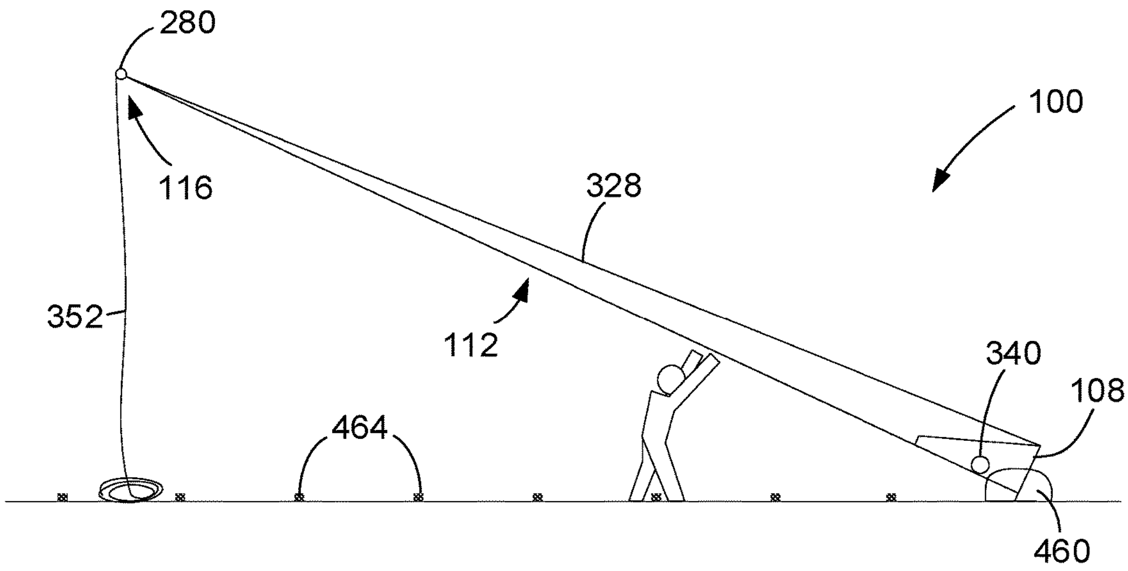
FIG. 15 is a side elevational view of the freestanding exhibit display of FIG. 1 in a partially upright position.
Figure 16:
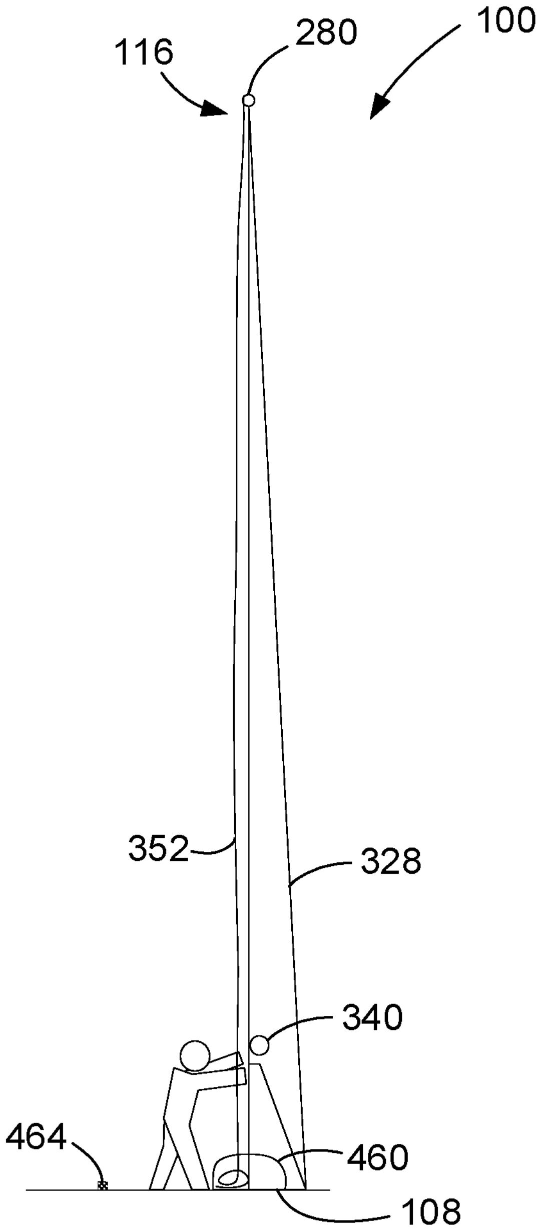
FIG. 16 is a side elevational view of the freestanding exhibit display of FIG. 1 in an upright position.

The bumpers 168 of the base 108 are connected to the frame 148. The bumpers 168 are formed from an elastomer such as rubber or a polymer. As shown in FIG. 5, the bumpers 168 each define a rounded front edge 204 that is configured to roll on the ground during setup of the exhibit display 100. The bumpers 168 are located at or near corners of the frame 148 to facilitate rotating the exhibit display 100 from a setup position (FIG. 14) to a display position (FIG. 16) during erection. Moreover, the bumpers 168 protect the floor from damage during the setup process, which is illustrated in FIG. 14-16.

As shown in FIG. 1, the upright support structure 112 extends from the base 108 and includes a lower section 208 and an extender section 212. The lower section 208 (shown in isolation in FIG. 6) is connected to the frame 148 by the vertical support member 156 and a plurality of the outriggers 176.

Figure 6:
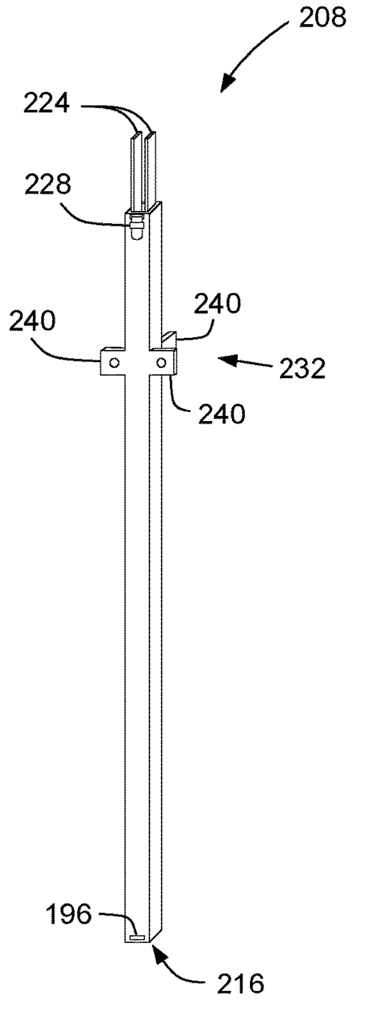
FIG. 6 is a lower section of an upright support structure of the freestanding exhibit display of FIG. 1.

With reference to FIG. 6, the lower section 208 is a tubular member defining a tang receiving opening 216 and including the toggle clamp catch 196, connecting tangs 224, another toggle clamp 228, and an outrigger support structure 232. The tang receiving opening 216 is configured to receive the connecting tangs 184 of the vertical support member 156 to connect the lower section 208 to the vertical support member 156 of the base 108. When the lower section 208 is connected to the vertical support member 156, the toggle clamp catch 196 is configured to receive the toggle clamp 188 of the vertical support member 156 to lock or to secure the lower section 208 to the post portion 180. When the lower section 208 is locked to the post portion 180 of the vertical support member 156, the connecting tangs 184 of the vertical support member 156 cannot be removed from the tang receiving opening 216 of the lower section 208.

Figure 7:
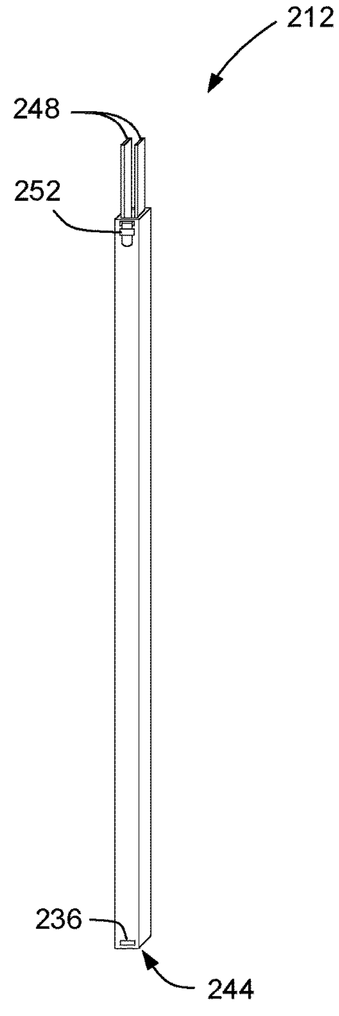
FIG. 7 is an upper section of the upright support structure of the freestanding exhibit display of FIG. 1.

The connecting tangs 224 and the toggle clamp 228 of the lower section 208 are substantially identical to the connecting tangs 184 and the toggle clamp 188 of the vertical support member 159. Specifically, the connecting tangs 224 extend away from the lower section 208 and away from the frame 148 when the lower section 208 is connected to the vertical support member 156. The connecting tangs 224 are formed from flat bars welded or otherwise connected inside of the lower section 208. The connecting tangs 224 are configured to receive and to support the extender section 212 (FIG. 7) of the upright support structure 112. The lower section 208 includes two of the connecting tangs 224, but in other embodiments, the lower section 208 includes any suitable number of the connecting tangs 224, such as from one to four. The toggle clamp 228 is connected to the lower section 208 and is configured to engage a corresponding toggle clamp catch 236 (FIG. 7) of the extender section 212 to connect the extender section 212 to the lower section 208.

The outrigger support structure 232 is fixedly connected to the lower section 208 and includes three tabs 240 fixedly extending from the lower section 208. Each tab 240 is configured for connection to a corresponding one of the outriggers 176. In some embodiments, the tabs 240 extend from the outriggers 176 instead of (or in addition to) extending from the lower section 208. In such an embodiment, the tabs 240 extend from a top portion of the outriggers 176 and the lower section 208 may not include the support section 232.

The extender section 212 of the upright support structure 112 is configured for connection to the lower section 208 of the upright support structure 112. The extender section 212, which is also referred to herein as an upper section, is substantially identical to the lower section 208, except that the extender section 212 does not include the outrigger support structure 232. The extender section 212 is a tubular member that defines a tang receiving opening 244 and includes the toggle clamp catch 236, connecting tangs 248, and another toggle clamp 252. The tang receiving opening 244 is configured to receive the connecting tangs 224 of the lower section 208 of the upright support structure 112 to connect the extender section 212 to the lower support 208 and the base 108. When the extender section 212 is connected to the lower section 208, the toggle clamp catch 236 is configured to receive the toggle clamp 228 of the lower section 208 to lock or to secure the extender section 212 to the lower section 208. When the extender section 212 is locked to the lower section 208, the connecting tangs 224 of the lower section 208 cannot be removed from the tang receiving opening 244 of the upper section 212. The extender section 212 is interchangeable with the lower section 208 as may be useful for certain applications of the exhibit display 100. That is, the tang receiving opening 244 of the upper section 212 is also configured to receive the connecting tangs 184 of the vertical support member 156, which are substantially identical to the connecting tangs 224 of the lower section 208.

The lower section 208 and the upper section 212 of the upright support structure 112 are typically formed from the same material as the post portion 180 of the vertical support structure 156. As such, in one embodiment, the lower section 208 and the extender section 212 are formed from 2"×2" aluminum channel. Thus, the upright support structure 112 is strong, rigid, and relatively light, thereby making the upright support structure 112 easily transportable by one person. In other embodiments, any suitably strong and rigid material may be used to form the upright support structure 112 such as steel or wood. In one particular embodiment, the upright support structure 112 is formed from steel tubing or pipe.

In the exemplary embodiment of FIG. 1, the exhibit display 100 is shown as including one of the lower section 208 and one of the extender section 212, which each have a length of about five feet, thereby making the total height of the exhibit display 100 about eleven feet. In other embodiments, the exhibit display 100 includes a plurality of the extender sections 212 connected to each other in a lengthwise manner to increase the total height of the exhibit display 100. For example, the exhibit display 100 has a height of approximately forty feet in an embodiment including one of the lower section 208 and seven of the 5-foot extender sections 212 connected together in the lengthwise manner. The length of the lower section 208 and the extender section 212 are selected based on a desired total height of the exhibit display 100, which may range from about five feet to forty feet in 2.5-foot increments. When the exhibit display 100 is configured to have a height of forty feet, the exhibit display 100 is at least 36% taller than known freestanding exhibit displays, thereby enabling the exhibit display 100 to provide far more flexibility and versatility than inflatable screens and the like.

Figure 18:
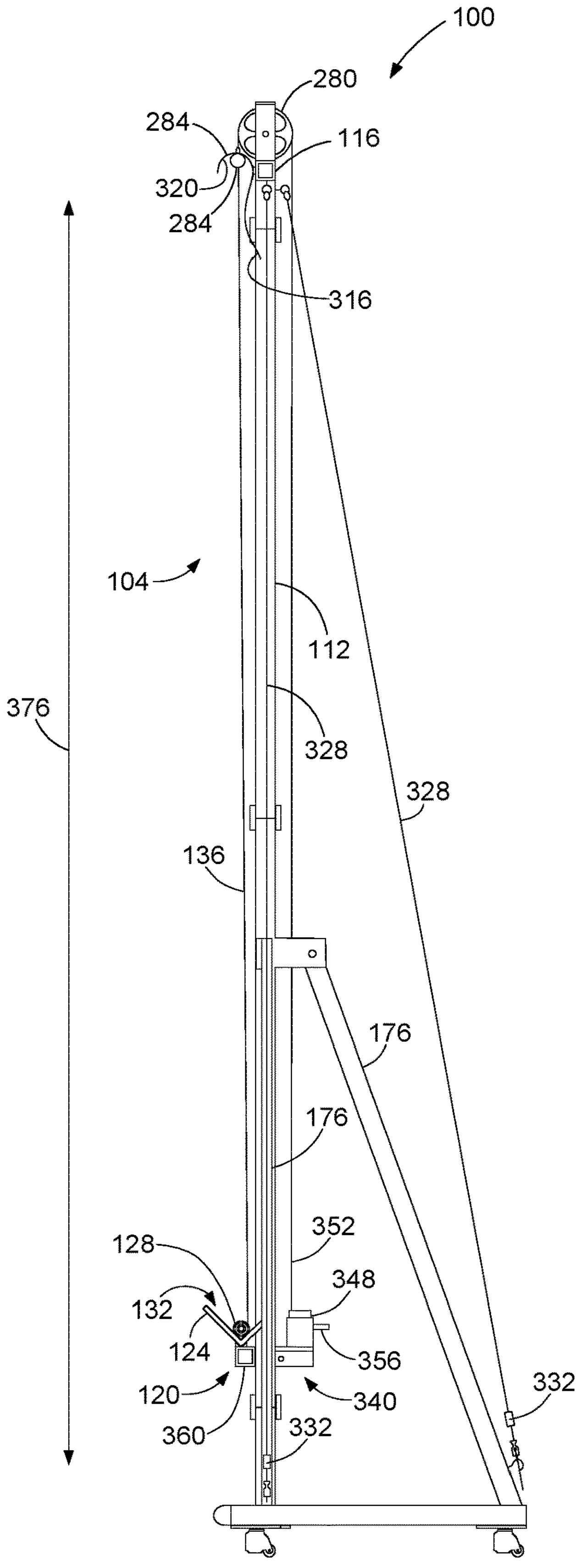
FIG. 18 is a side elevational view of the freestanding exhibit display of FIG. 1 in the upright position and with the banner in an unfurled configuration.
Figure 19:
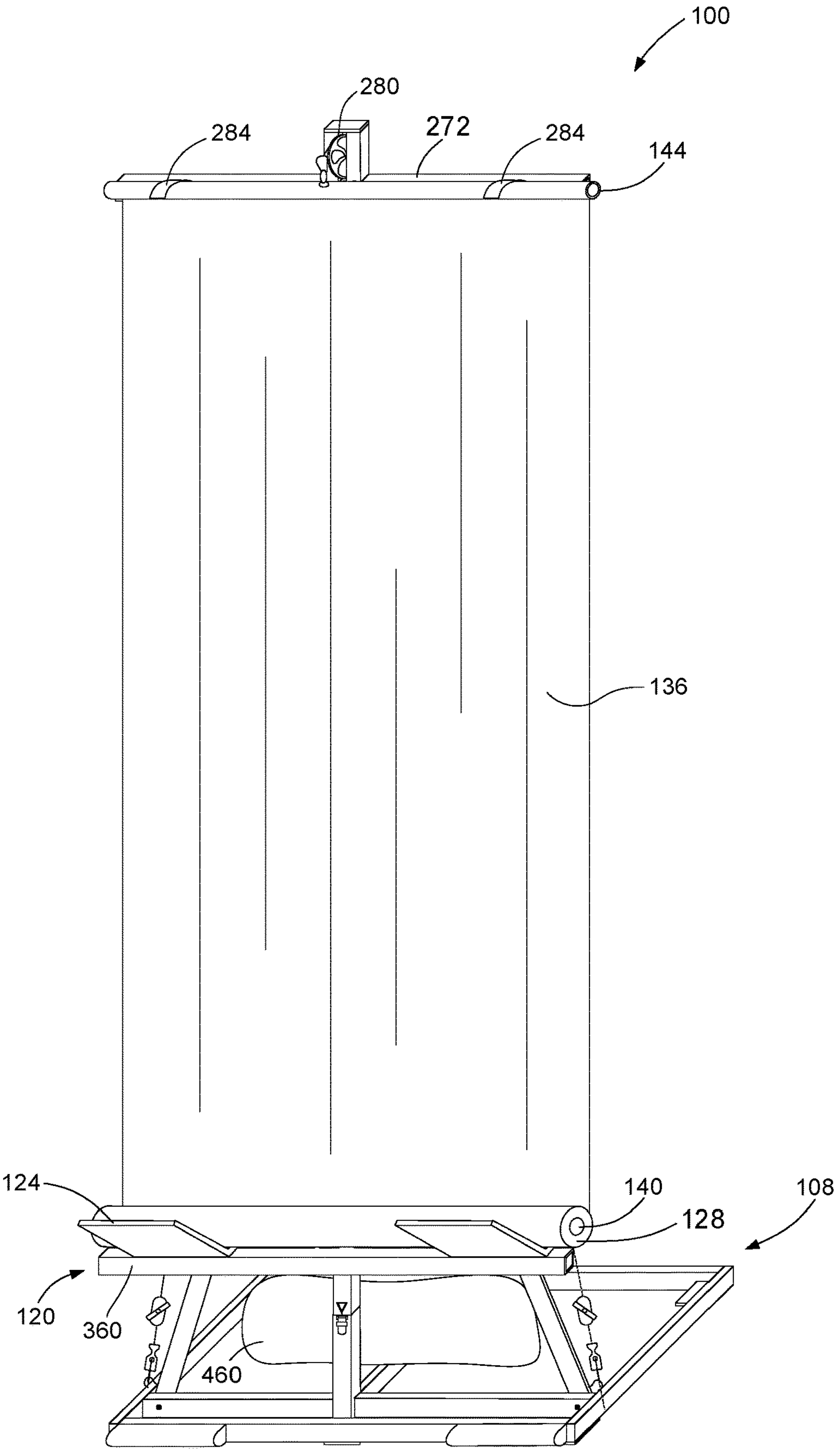
FIG. 19 is a perspective view of the freestanding exhibit display of FIG. 1 in the upright position and with the banner in the unfurled configuration.

As shown in FIG. 8, the outrigger 176 is a substantially inflexible member that is configured for connection at a first end 256 to the lower section 208 of the upright support structure 112 and at a second end 260 to the base 108. The outriggers 176 are configured to inhibit movement of the upright support structure 112 relative to the base 108 as may tend to occur when the banner 104 is unfurled (FIGS. 18 and 19). With reference to FIG. 1, the exhibit display 100 includes three of the outriggers 176 connected to the base 108 and the upright support structure 112. Specifically, the outriggers 176 are connected to the outrigger support structure 232 (FIG. 6) and to the outrigger support openings 172 (FIG. 2) of the cross members 152. A connecting bolt 264 is shown in FIG. 8 for connecting the outrigger 176 to one of the outrigger support openings 172. Any other suitable connection device is usable to connect the outriggers 176 to the upright support structure 112 and the base 108, such as bolts, clasps, hooks, pins, and fittings.

Figure 9:
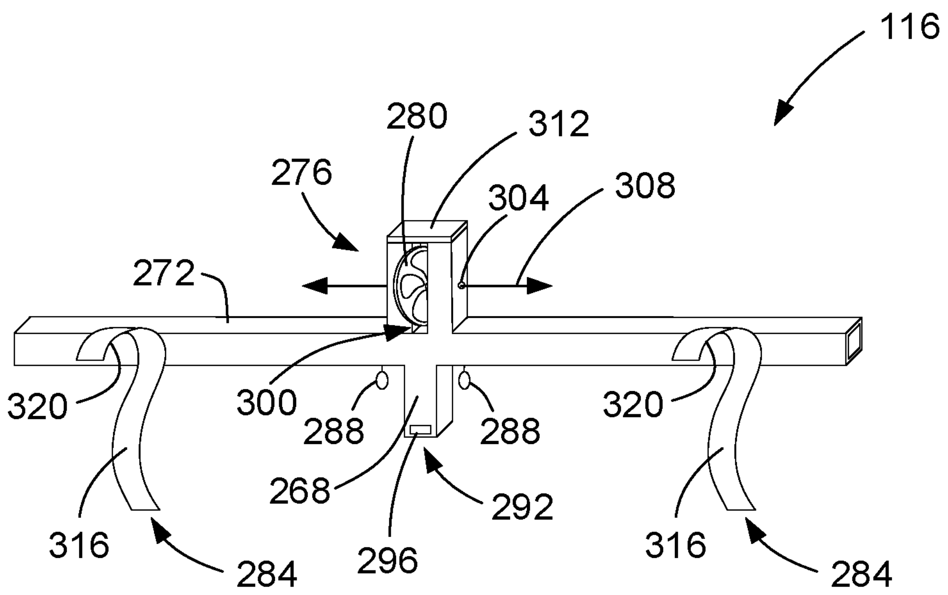
FIG. 9 is a perspective view of an upper transverse support structure of the freestanding exhibit display of FIG. 1.
Figure 10:
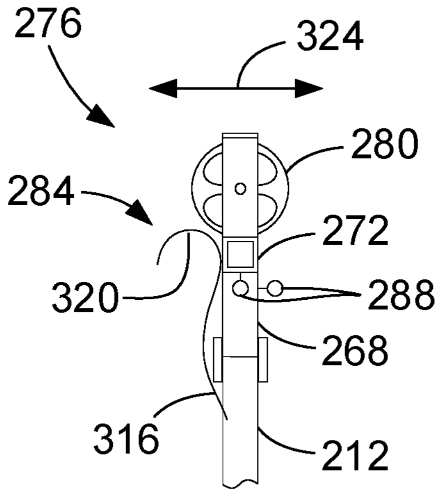
FIG. 10 is a side elevational view of the upper transverse support structure of FIG. 9.

With reference to FIGS. 9 and 10, the upper transverse support structure 116 includes a connection portion 268, a horizontal arm 272 extending from the connection portion 268, a pulley support structure 276, a pulley 280, at least one curved banner support member 284, and at least one eyelet 288. The connection portion 268 defines a tang receiving opening 292 configured to receive the connecting tangs 248 of the extender section 212 of the upright support structure 112 (i.e. the uppermost extender section 212 in a configuration of the exhibit display 100 having more than one of the upper section 212) in order to connect the upper transverse support structure 116 to the upright support structure 112. The connection portion 268 defines a toggle clamp catch 296 to receive the toggle clamp 252 of the extender section 212 to fixedly connect the connection portion 268 to the extender section 212 and to inhibit inadvertent disconnection of the upper transverse support structure 116 from the upright support structure 112.

The horizontal arm 272 is generally parallel to the frame 148 and perpendicular to the upright support structure 112. The horizontal arm 272 is located between the connection portion 268 and the pulley support structure 276. In one embodiment, the horizontal arm 272 is formed from a rigid material, such as 2"×2" aluminum channel.

The pulley support structure 276 is located at a distal end portion of the upright support structure 112 and is configured to support rotatably the pulley 280, which is also located at the distal end portion of the upright support structure 112. The pulley support structure 276 defines a pulley opening 300 in which the pulley 280 is at least partially located and includes a shaft 304 about which the pulley 280 rotates relative to the horizontal arm 272 about an axis of rotation 308. The axis of rotation 308 is parallel to the horizontal arm 272 and the ground and is perpendicular to the upright support structure 112. The pulley support structure 276 includes a cap 312 to cover the pulley opening 300.

As shown in FIGS. 9 and 10, the banner support members 284 are connected to the horizontal arm 272. Each banner support member 284 defines a lower curved surface 316 and an upper curved surface 320. The lower curved surfaces 316 are configured to guide the support rod 144 of the banner 104 to the upper curved surfaces 320 during unfurling of the banner 104. Each upper curved surface 320 abuts the unfurled portion 136 and prevents the banner 104 from being vertically displaced any further. The upper curved surfaces 320 also position and align the banner 104 in a lateral direction 324 (FIG. 10) to a position that inhibits at least the support rod 144 from contacting the upright support structure 112. The banner support members 284, in one embodiment, are spring-like and are formed from a flexible material that bends when contacted by the banner 104, but that springingly returns to the shape shown in FIGS. 9 and 10.

With reference again to FIG. 1, the exhibit display 100 includes a plurality of guy wires 328 configured to stabilize the upright support structure 112 and the upper transverse support structure 116 relative to the base 108. Three exemplary guy wires 328 are included and each guy wire 328 includes a mini-winch 332 (only two are visible) or other tension adjustment mechanism. Each guy wire 328 extends from the upper transverse support structure 116 and extends to the base 108. The mini-winches 332 are configured to tension the guy wires 328 so that the upright support structure 112 is vertical or otherwise positioned as desired.

Figure 11:
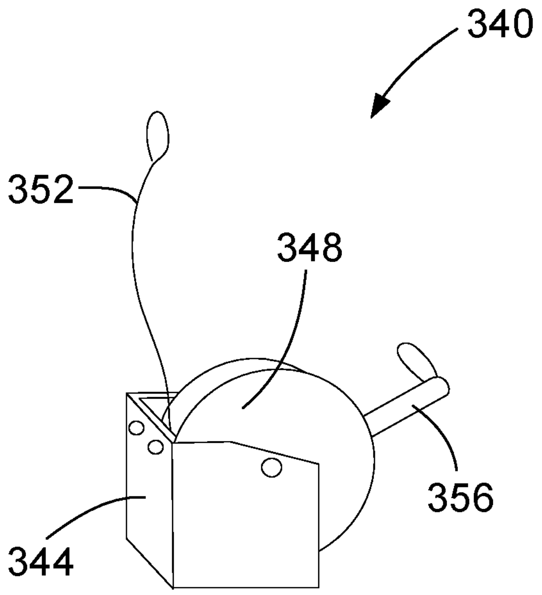
FIG. 11 is a perspective view of winch system of the freestanding exhibit display of FIG. 1.
Figure 17:
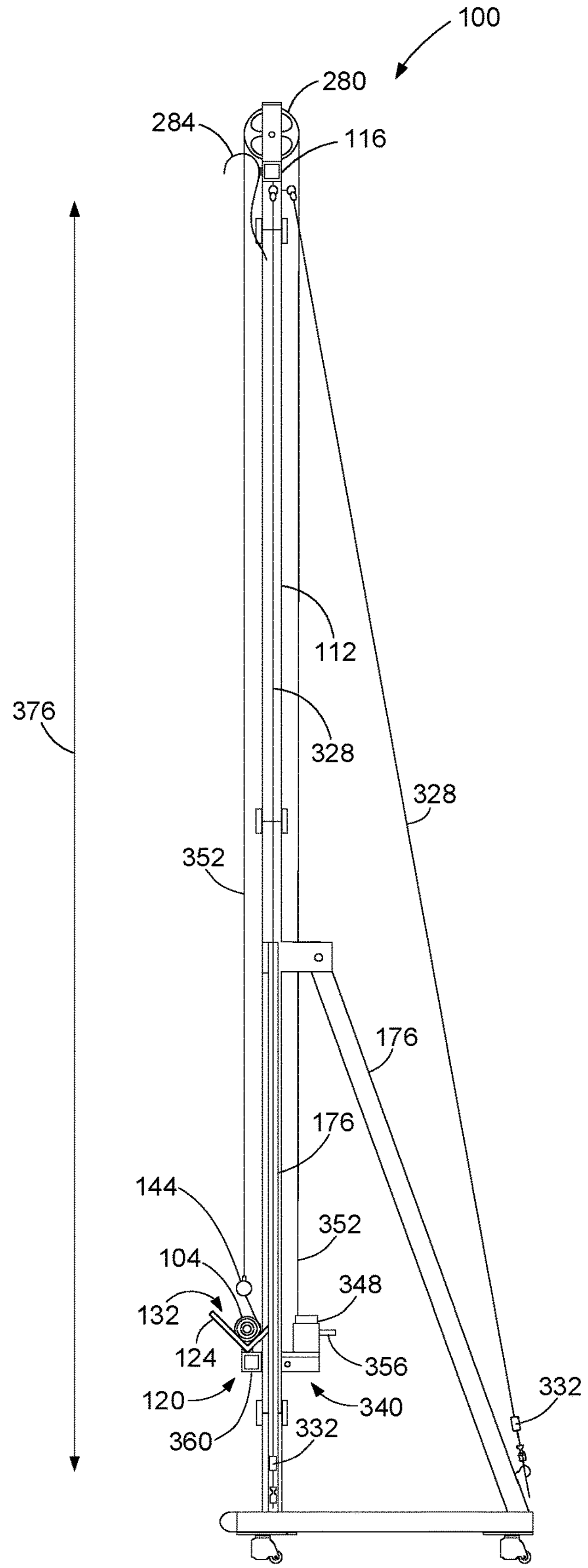
FIG. 17 is a side elevational view of the freestanding exhibit display of FIG. 1 in the upright position and with the banner in a furled configuration.

As shown in FIG. 11, the exhibit display 100 includes a winch system 340 configured to mount to the upright support structure 112. The winch system 340 includes a mounting bracket 344, a winch 348, and a cable 352. The mounting bracket 344 is connectable to the upright support structure 112 (FIG. 1). Specifically, the mounting bracket 344 is connected to the lower section 208 of the upright support structure 112. The winch 348 is configured to retract and to unwind the cable 352 in response to rotation of a handle 356. As shown in FIG. 17, the cable 352 is guided from the winch 348, up the upright support structure 112, to the pulley 280, down the upright support structure 112, and is connected to the banner 104.

Figure 12:
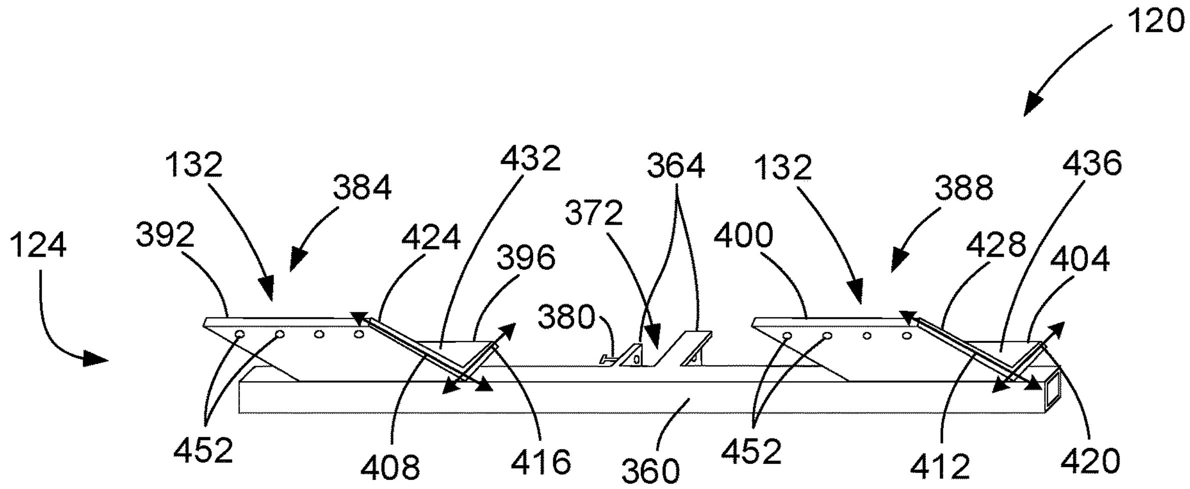
FIG. 12 is a perspective view of a lower transverse support structure of the freestanding exhibit display of FIG. 1.
Figure 13:
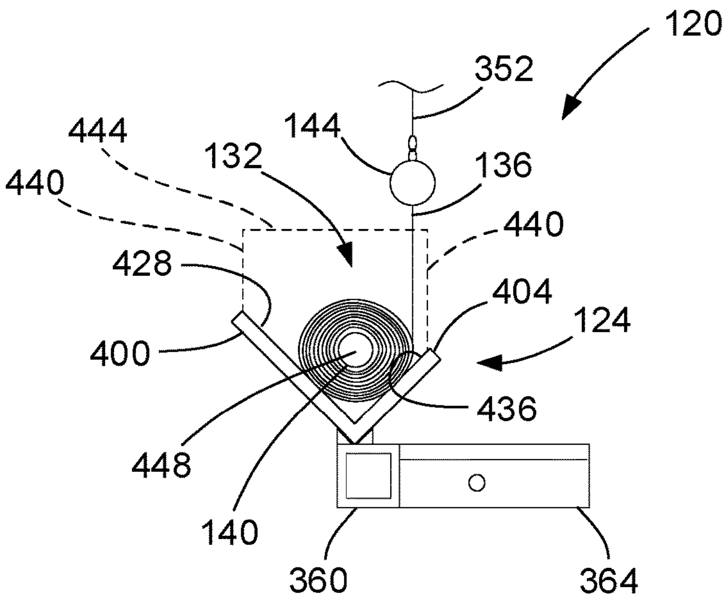
FIG. 13 is a side elevational view of the lower transverse support structure of FIG. 12.

As shown in FIGS. 12 and 13, the lower transverse support structure 120 includes a transverse support arm 360, a mounting bracket 364, and the cradle 124. The transverse support arm 360 is substantially the same as the horizontal arm 272 of the upper transverse support structure 116. That is, the horizontal support arm 360 and the horizontal support arm 272 are substantially the same length and width and are formed from the same material. The mounting bracket 364 extends from the transverse support arm 360 and defines a mounting space 372 configured to receive the upright support structure 112. A portion of the upright support structure 112 is positioned in the mounting space 372 to mount the lower transverse support structure 120, including the transverse support arm 360, on the upright support structure 112. The mounting bracket 364 configures the lower transverse support structure 120 to be placed in a selected vertical position on the upright support structure 112 along a vertical adjustment range 376 (FIG. 17), which includes the entire upright support structure 112 except for the region near the outrigger support structure 232. A bolt 380 or other fastener extends through a portion of the mounting bracket 364 to connect fixedly the lower transverse support structure 120 to the upright support structure 112.

The cradle 124 includes a left cradle support structure 384 spaced apart from a right cradle support structure 388. Each cradle support structure 384, 388 is fixedly connected to the transverse support arm 360. The upright support structure 112 is located directly between the cradle support structures 384, 388.

The left cradle support structure 384 includes an outer inclined support member 392 and an inner inclined support member 396 that intersect each other, and the right cradle support structure 388 includes an outer inclined support member 400 and an inner inclined member 404 that intersect each other. The outer inclined support members 392, 400 each define a support plane 408, 412 and the support planes 408, 412 are coplanar. The inner inclined support members 396, 404 also each define a support plane 416, 420 and the support planes 416, 420 are coplanar. The support planes 408, 412 defined by the outer inclined support members 392, 400 intersect the support planes 416, 420 defined by the inner inclined support members 396, 400.

Each of the outer inclined support members 392, 400 defines a support surface 424, 428 and each of the inner inclined support members 396, 404 defines another support surface 432, 436. The support surfaces 424, 428 are coplanar and the support surfaces 432, 436 are coplanar. The support surface 424 intersects the support surface 432, and the support surface 428 intersects the support surface 436.

As shown in FIG. 13, the cradle 124 defines the cradle space 132 in which at least the furled portion 128 of the banner 104 is located. The cradle space 132 is defined partially by the left cradle support structure 384 (FIG. 12) and partially by the right cradle support structure 388 (FIG. 12). As viewed from the side in FIG. 13, the cradle space 132 is generally "V"-shaped and is open at the top. That is, no structure of the cradle 124 covers the top side of the cradle space 132. In one embodiment, as shown in FIG. 13, the cradle space 132 has a pentagonal side profile and extends above the cradle 124 as defined by the vertical edge lines 440 and the horizontal edge line 444. As set forth below, the cradle 124 is configured to retain the furled portion 128 of the banner 104 in the cradle space 132 with only gravity. Moreover, the cradle 124 is configured to prevent and/or to inhibit a center of mass 448 of the furled portion 128 from moving to a position that causes the furled portion 128 to exit the cradle space 132 during unfurling of the banner 104.

Figure 20:
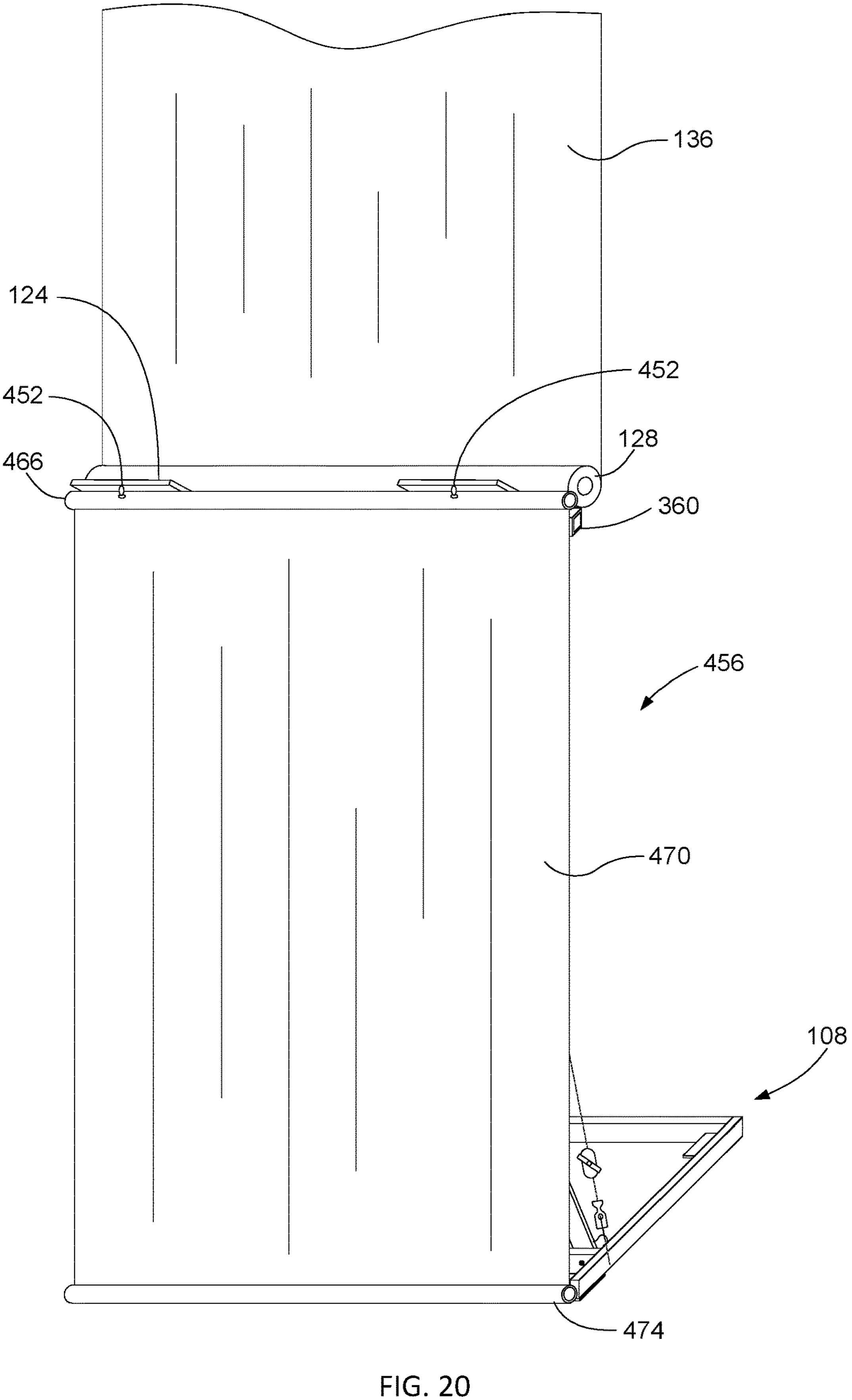
FIG. 20 is a perspective view of a portion of the freestanding exhibit display of FIG. 1 showing a second banner connected to the lower transverse support structure.

With reference again to FIG. 12, the outer inclined support members 392, 400 include a banner connection structure 452 for supporting a second banner 456 (FIG. 20). In one embodiment, the connection structure 452 defines openings extending completely through the outer inclined support members 392, 400, which are configured to receive a hanging feature (not shown) of the other banner 456, such as a hook. In another embodiment, the connection structure 452 includes hanging features (such as hooks) configured to connect to the other banner 456. The banner connection structure 452 includes any type of connection member for supporting the additional banner 456.

In operation, the freestanding exhibit display 100 is erected according to the stages illustrated in FIGS. 14-16. First, as shown in FIG. 14, the upright support structure 112 is connected to the base 108 and the upper transverse support structure 116 is connected to the upright support structure 112. Blocks 464 are placed under the exhibit display 100 to enable easy connection and alignment of the lower section 208 and the upper section(s) 212. Next, the winch system 340 is mounted to the upright support structure 112 and the cable 352 is threaded around the pulley 280. Thereafter, the guy wires 328 are installed and made taught with the mini winches 332 (FIG. 1). Typically, the lower transverse support structure 120 is not connected to the upright support structure 112 at this stage (i.e. FIG. 14).

Next, as shown in FIG. 15, the erector "walks" the exhibit display 100 to the upright position (as shown in FIG. 16), by rolling the exhibit display 100 about the rounded front edges 204 of the bumpers 168. The bumpers 168 inhibit the base 108 from slipping or moving on the ground during the walking-up process and from causing damage to the floor. As shown in FIG. 16, although not required, when the exhibit display 100 is in the upright position, a sandbag 460 is placed on the base 108 to inhibit movement of the exhibit display 100. Also, the casters 164 (FIG. 4) and the mini winches 332 (FIG. 1) are adjusted to level the exhibit display 100 and to make the upright support structure 112 plumb. Only when the exhibit display 100 has an overall height of greater than twenty-five feet are two erectors used to walk-up the exhibit display 100. Alternatively, the sandbag 460 can be placed across the bumpers 168 at the rotation point to allow one erector to walk-up the exhibit display 100 in any configuration. When the height of the exhibit display 100 is less than twenty-five feet, the exhibit display 100 is easily walked-up by just one erector, thereby making the exhibit display 100 simple, fast, and efficient to prepare for display. The sandbag 460 is typically not required when the height of the exhibit display 100 is less than about thirty feet.

As shown in FIG. 17, the lower transverse support structure 120 is mounted on the upright support structure 112 in a desired position along the vertical adjustment range 376. The desired position of the lower transverse support structure 120 is selected based on the length of the banner 104 and the lowest point at which the banner 104 should be displayed, among other factors.

Next, the banner 104 is placed in the cradle space 132 of the cradle 124. Specifically, the furled portion 128 of the banner 104 is rested against the support surfaces 424, 428, 432, 436 (FIG. 12). Since the support surfaces 424, 428, 432, 436 are inclined, the banner 104 is "funneled" towards the intersection point of the outer inclined support members 392, 400 and the inner inclined support members 396, 404. The cable 352 of the winch 348 is connected to the support rod 144 of the banner 104 to connect the winch system 340 to the banner 104. No structural connection of any type, however, is formed between the furled portion 128 of the banner 104 and the freestanding exhibit display 100. Instead, the furled portion 128 of the banner 104 is held in the cradle space 132 by gravity alone (i.e. by gravity only).

In known exhibit displays, a structural connection is required between the furled portion of the banner and the exhibit display. Typically, the structural connection affixes the core of the furled portion of the banner to at least one core support member. The core is configured to rotate about the structural connection. A common example of this type of structural connection is found in a typical classroom map or projector screen that is supported above a chalkboard and is pulled downward to unfurl and display. The furled portion of the map or projector screen is structurally connected to the exhibit display frame for rotation during unfurling. The furled portion of the map or projector screen is not easily exchanged from the exhibit display frame and, in effect, is permanently structurally connected to the exhibit display frame. The freestanding exhibit display 100, however, requires no such complicated and time consuming structural connection to the banner 104. Instead, the banner 104 is simply dropped into the cradle space 132 with no structural connection to the freestanding exhibit display 100. The freestanding exhibit display 100, therefore, enables extremely fast exchanging of banners 104 and extremely fast setup of the exhibit display 100, while preserving the flexibility to unfurl just the necessary amount of banner (or screen) for the application.

Next, as shown in FIGS. 18 and 19, the erector unfurls the banner 104 using the winch system 340. Specifically, the erector rotates the handle 356 to retract the cable 352 to the winch 348. As the cable 352 is retracted, the pulley 280 is rotated and the support rod 144 of the banner 104 is drawn up the upright support structure 112 toward the banner support members 284. The support rod 144 contacts the lower curved surfaces 316 of the banner support members 284 and is guided towards the upper curved surfaces 320 of the banner support members 284. When the support rod 144 contacts the upper curved surfaces 320, the banner 104 is ready for display and is properly spaced apart from the upright support structure 112.

During unfurling of the banner 104, the cradle 124 retains the furled portion 128 of the banner 104 within the cradle space 132. Specifically, the cradle 124 retains the furled portion 128 of the banner 104 in the cradle space 132 without any portion of the freestanding exhibit display 100 being connected to the furled portion 128. That is, the freestanding exhibit display 100 is completely disconnected from the furled portion 128, such that the furled portion 128 is freely removable from the cradle space 132. The term "completely disconnected" means that no structure of the exhibit display 100 prevents removal of the furled portion 128 from the cradle space 132. A "freely removably" furled portion 128 is removably from the cradle space 132 without configuration or manipulation of any portion of the exhibit display 100 and is freely movable relative to the cradle space. Accordingly, the user simply lifts the furled portion 128 out of the cradle space 132 without having to "dismount" the core 140 or release a roller system, as is required in known exhibit displays.

The furled portion 128 rotates within the cradle space 132 during unfurling of the banner 104 in response to retraction of the cable 352 by the winch system 340. Moreover, in some embodiments, the furled portion 128 tends "to climb" the support surfaces 424, 428, 432, 436 during unfurling of the banner 104. The support surfaces 424, 428, 432, 436 of the cradle 124, however, are sufficiently inclined to inhibit the furled portion 128 from exiting the cradle space 132 during unfurling. That is, a coefficient of friction between the support surfaces 424, 428, 432, 436 of the cradle 124 and the furled portion 128 is insufficient for the furled portion 128 to grip the support surfaces 424, 428, 432, 436 and to climb out of the cradle space 132 during unfurling of the banner 104. Instead, during unfurling, the furled portion 128 rotates and is pulled down the support surfaces 424, 428, 432, 436 by gravity, such that the furled portion 128 remains at or near the intersection point of the outer inclined support members 392, 400 and the inner inclined support members 396, 404. Stated differently, a gravitational force exerted on the furled portion 128 is greater than any other force exerted on the furled portion 128 during unfurling of the banner 104.

Moreover, depending on the speed at which the handle 356 is cranked during unfurling of the banner 104, the furled portion 128 tends to "jump" within cradle space 132 and bounce between the cradle support surfaces 424, 428, 432, 436. The inclined configuration of the cradle support surfaces 424, 428, 432, 436 inhibits the furled portion 128 from "jumping" or bouncing out for the cradle space 132 during unfurling of the banner 104. That is, the cradle 124 is configured to inhibit the center of mass 448 of the furled portion 128 from moving or "jumping" to a location that enables the furled portion 128 to exit the cradle space 132 during unfurling of the banner 104.

In FIG. 19, the freestanding exhibit display 100 is shown in the upright position with the banner 104 fully displayed. No structural connection is provided between the furled portion 128 and the freestanding exhibit display 100 during display of the banner 104 in the fully displayed configuration (i.e. as shown in FIG. 19). Moreover, the exhibit display 100 is completely freestanding with no connection to the facility in which it is located. That is, there is no anchoring connection between the exhibit display 100 and the facility. Furthermore, the exhibit display 100 is suitable for freestanding use in an outdoor setting. In an outdoor setting, the banner 104 is typically formed from mesh to allow most wind to pass through the banner 104 without displacing the exhibit display 100. The sandbag 460 stabilizes the exhibit display 100 and inhibits movement of the exhibit display 100 during periods of wind in an outdoor setting. Even at a height of forty feet, the exhibit display 100 is freestanding in an outdoor environment without any type of anchoring to the environment.

Figure 21:
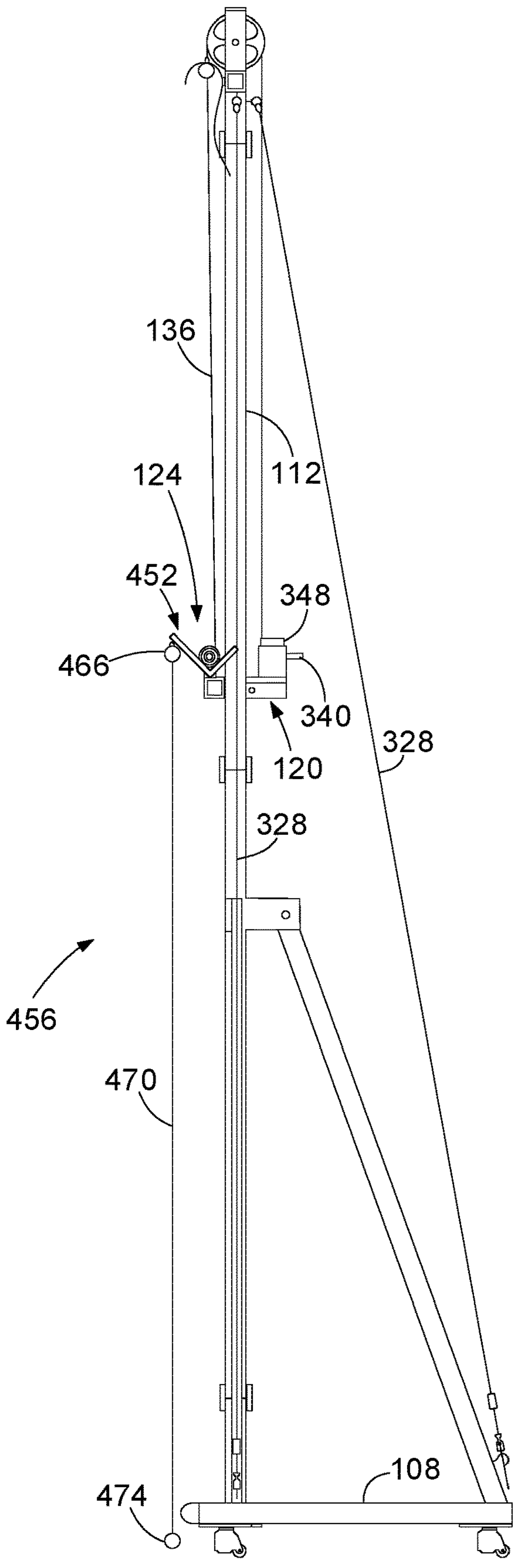
FIG. 21 is a side view of the freestanding exhibit display of FIG. 1 showing the second banner of FIG. 20.

As shown in FIGS. 20 and 21, the freestanding exhibit display 100 is also configured to support the second banner 456 (also referred to as a curtain) from the banner connection structure 452 of the cradle 124. The second banner 456 includes a connection structure 466, a curtain portion 470 extending from the connection structure 466, and a weighted bottom 474. The connection structure 466 hooks into the banner connection structure 452 of the cradle 124 to connect the second banner 456 to the freestanding exhibit display 100. As shown in FIG. 20, the second banner 456 is configured to mask the portion of the freestanding exhibit display 100 located below the lower transverse support structure 120. The second banner 456 is located completely outside of the cradle space 132 when connected to the banner connection structure 452. FIG. 21 also illustrates the lower transverse support structure 120 secured to the upright support structure 112 in a different vertical position than shown in FIG. 18.

Figure 22:
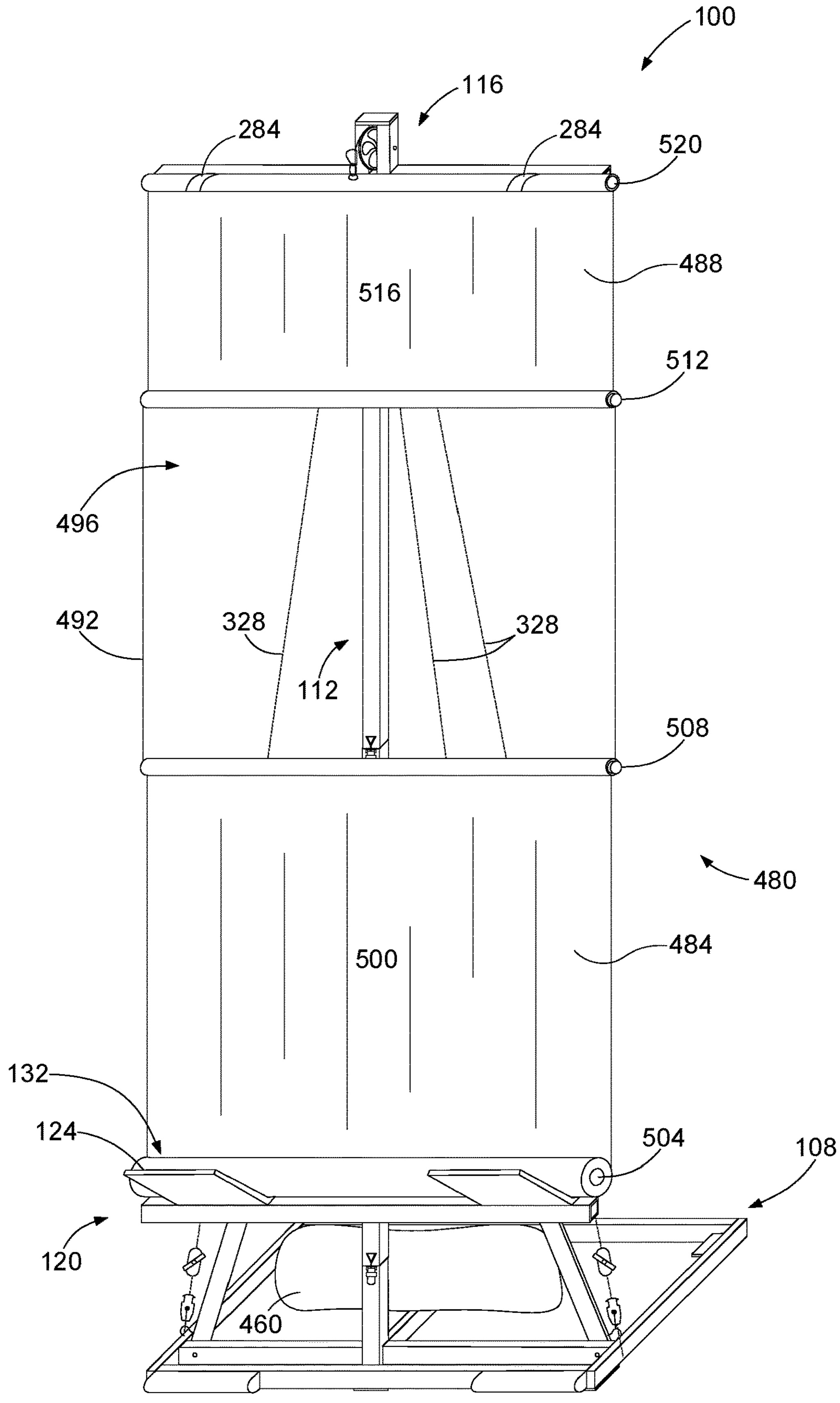
FIG. 22 is a perspective view of the freestanding exhibit display of FIG. 1 and another embodiment of the banner that includes an upper section spaced apart from a lower section.

FIG. 22 illustrates the freestanding exhibit display 100 with another embodiment of a banner 480. The banner 480 includes a lower portion 484 spaced apart from an upper portion 488 by a plurality of wires 492, such that a gap 496 is defined between the lower portion 484 and the upper portion 488. The lower portion 484 includes a lower banner portion 500, a core 504, and a support rod 508 connected to the plurality of wires 492. The upper portion 488 includes a lower support rod 512 connected to the plurality of wires 492, an upper banner 516, and an upper support rod 520 connected to the cable 352 (FIG. 21) of the winch 348 (FIG. 21).

Figure 23:
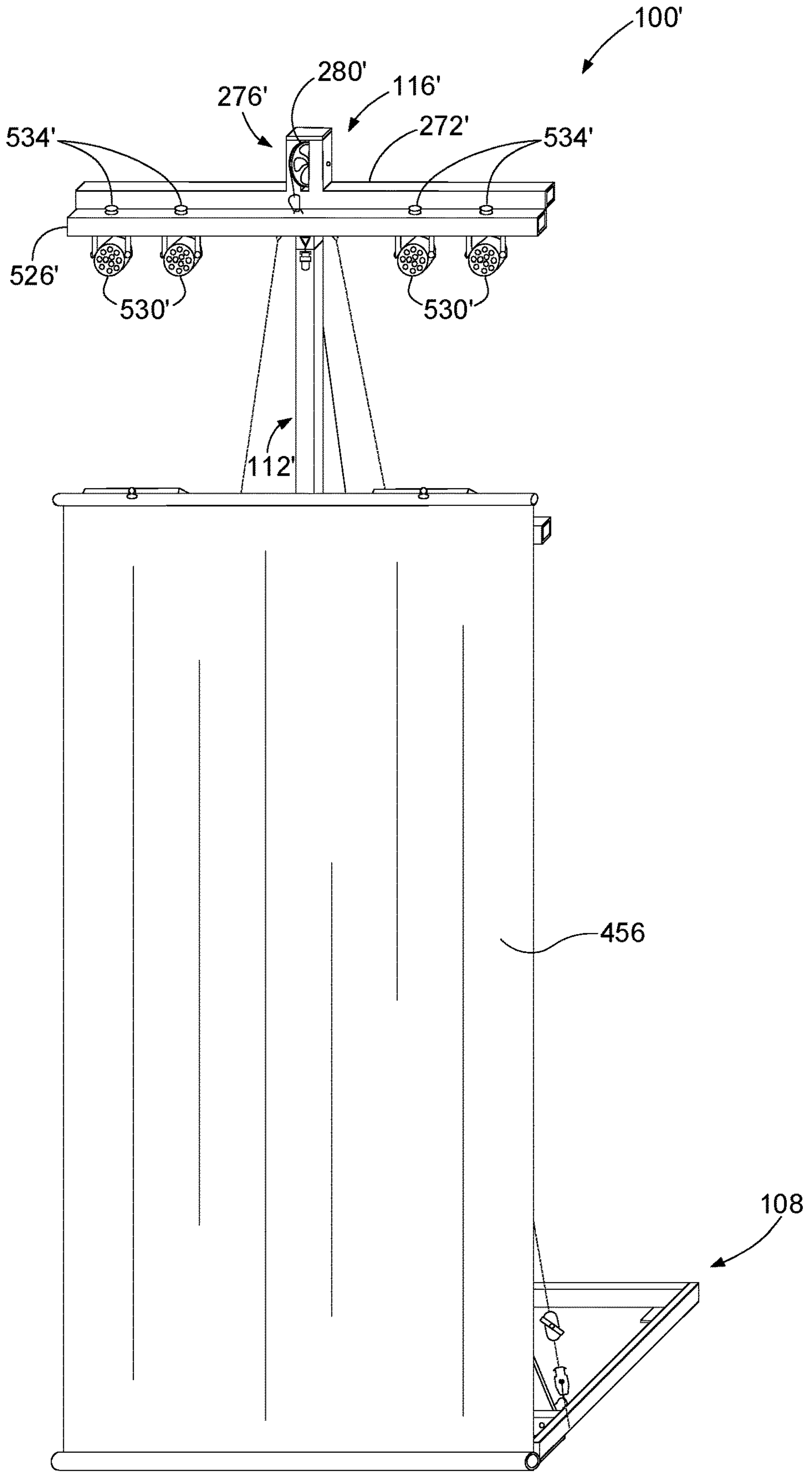
FIG. 23 is a perspective view of another embodiment of a freestanding exhibit display including a light fixture assembly.

As shown in FIG. 23, another embodiment of the freestanding exhibit display 100' is substantially the same as the freestanding exhibit display 100 and includes another embodiment of the upper transverse support structure 116'. The upper transverse support structure 116' is connected to the upright support structure 112' and includes a connection portion (not shown in FIG. 23), a horizontal arm 272' extending from the connection portion, a pulley support structure 276', and a pulley 280'. The horizontal arm 272' is substantially the same as the horizontal arm 272, the pulley support structure 276' is substantially the same as the pulley support structure 276, and the pulley 280' is substantially the same as the pulley 280.

The upper transverse support structure 116' includes a light bar 526', which is also referred to herein as a lighting support structure. The light bar 526' is fixedly connected to the horizontal arm 272', such that the light bar 526' is mounted on the upright support structure 112'. A plurality of light emitting units illustrated as light fixtures 530' is connected to the light bar 526'. The light bar 526' includes a plurality of fixture openings 534' configured to receive the light fixtures 530' and to secure the light fixtures 530' to the light bar 526'. The fixture openings 534' are also referred to herein as mounting points. The light fixtures 530' are configured to emit light onto the ground near the base 108' of the freestanding exhibit display 100'. Additionally, the light fixtures 530' are positionable to emit light suitable to the application. A power cord (not shown) electrically connects the light fixtures 530 to a source of electrical power. The upper transverse support structure 116' does not include the banner support members 284.

In another alternative embodiment of the upper transverse support structure 116', which is not shown, the light bar 526' is not included and the horizontal arm 272' defines the fixture openings 534' configured to receive the light fixtures 530'. In this embodiment, the light fixtures 530' are connected directly to the horizontal arm 272'.

Figure 24:
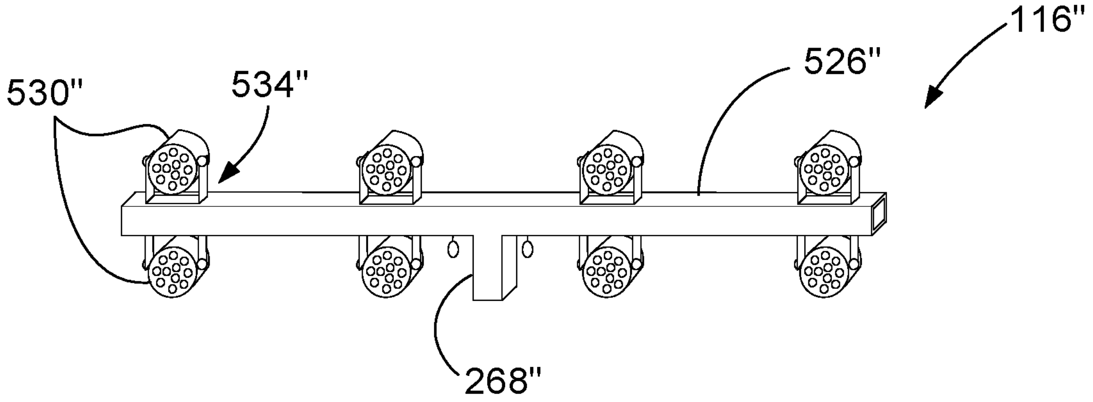
FIG. 24 is a perspective view of another light fixture assembly for use with at least the freestanding exhibit displays of FIGS. 1 and 23.

As shown in FIG. 24, yet another embodiment of the upper transverse support structure 116" includes only a connection portion 268" and a light bar 526". The light bar 526" includes fixture openings 534" configured to receive the light fixtures 530". The support structure 116" is not configured to support the banner 104 because the support structure 116" does not include the pulley support structure 276 and the pulley 280.

Figure 25A:
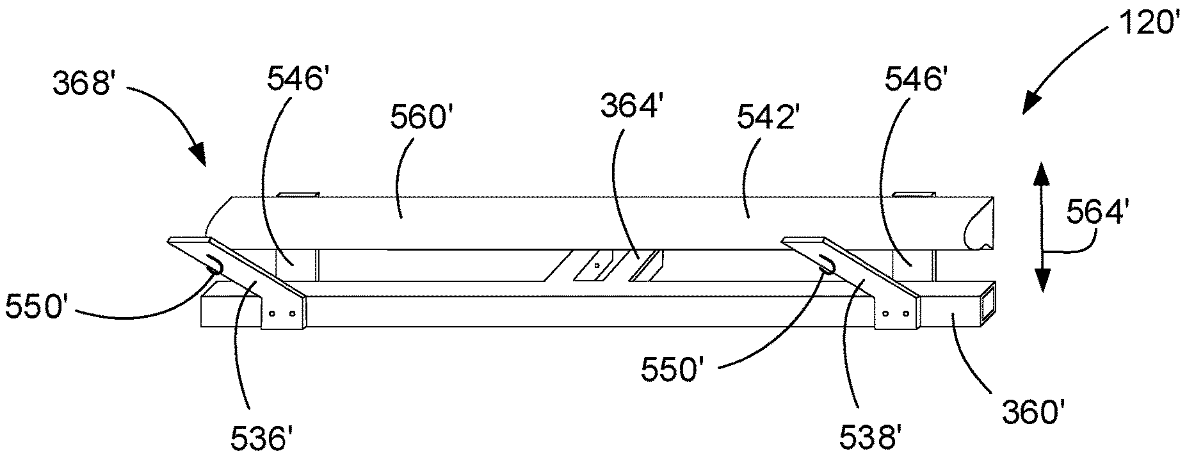
FIG. 25A is a front perspective view of another embodiment of a lower transverse support structure for use with at least the freestanding exhibit displays of FIGS. 1 and 23.
Figure 25B:
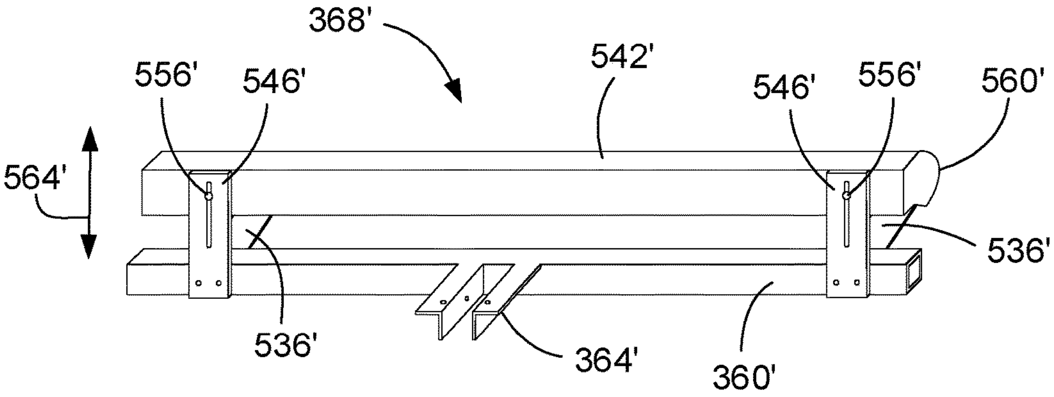
FIG. 25B is a rear perspective view of the lower transverse support structure of FIG. 25A.

As shown in FIGS. 25A and 25B, another embodiment of the lower transverse support structure 120' includes a transverse support arm 360', a mounting bracket 364', and a cradle 368'. The horizontal support arm 360' and the mounting bracket 364' are substantially the same as the horizontal support arm 360 and the mounting bracket 364. The cradle 368' includes a left outer inclined support member 536', a right outer inclined support member 538', and a support bar 542' connected to two upright arm members 546' with a plurality of set screws 556'. The inclined support members 536', 538' and the upright arm members 546' fixedly extend from the transverse support arm 360'. Specifically, the inclined support members 536', 538' extend from a first side 548' (FIG. 26) of the transverse support arm 360', and the upright arm members 546' extend from an opposite second side 552' (FIG. 26) of the transverse support arm 360'. The support bar 542' defines a banner support surface 560' configured to support the banner 104. The support bar 542' is adjustably mounted on the upright arm members 546' for adjustment in a vertical direction 564' between a raised position (FIGS. 25A, 25B, and 26) and a lowered position (FIGS. 27 and 28). The support bar 542' spans the distance between the upright arm members 546'. The length of the support bar 542' is substantially the same as the length of the transverse support arm 360'. The support bar 542' is spaced apart from the transverse support arm 360' and is mounted parallel to the transverse support arm 360'. The inclined support members 536', 538' include hooks 550' for connecting to the banner 456.

Figure 26:
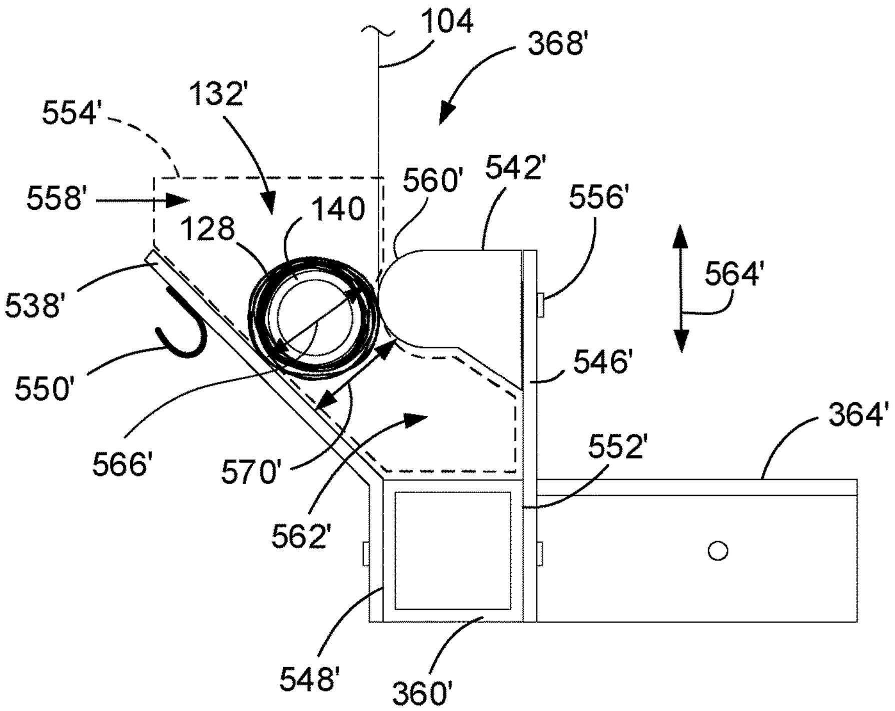
FIG. 26 is a side elevational view of the lower transverse support structure of FIG. 25A.
Figure 27:
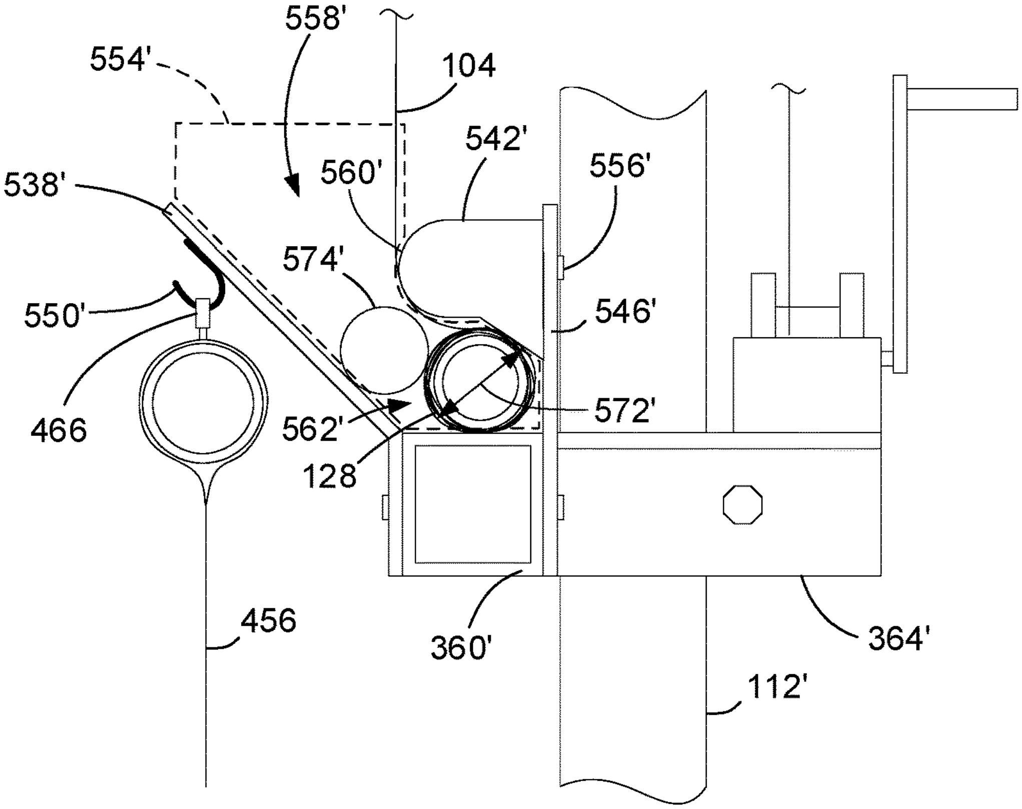
FIG. 27 is a side elevational view of the lower transverse support structure of FIG. 25A mounted on an upright support structure.
Figure 28:
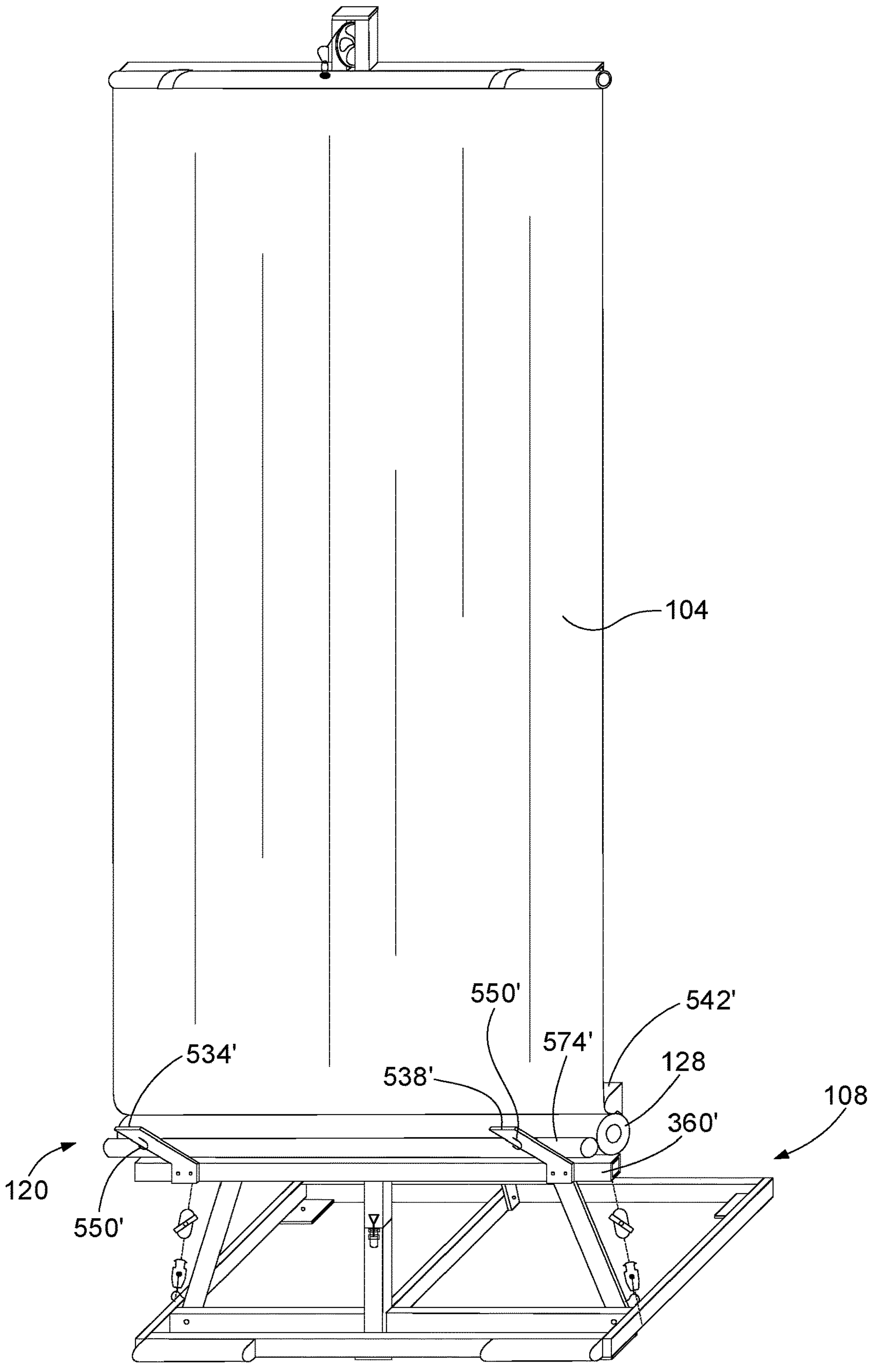
FIG. 28 is a perspective view of a freestanding exhibit display including the lower transverse support structure of FIG. 25A with the banner in an unfurled configuration.

FIGS. 26 and 27 show that the outer inclined support members 536', 538', the upright arm members 546', and the support bar 542' define a cradle space 132'. The cradle space 132' is identified by the broken line shape 554' and includes an unfurling region 558' and a display region 562'. As shown in FIG. 26, when the banner 104 is in a storage configuration and the furled portion 128 is placed in the cradle 368', the furled portion 128 defines a first diameter 566' and is located in the unfurling region 558' of the cradle space 132'. The banner 104 is substantially furled when in the storage configuration, and substantially furled corresponds to at least 90% of the banner 104 being wound around the core 140 and included in the furled portion 128. In the unfurling region 558', the unfurled portion 128 contacts the inclined support members 536', 538' and the curved surface 560' of the support bar 542', but is prevented from moving into the display region 562' because the first diameter 566' is greater than a minimum distance 570' between the support bar 542' and the inclined support members 536', 538'. In one embodiment, the minimum distance 570' is located at and defines a boundary of the unfurling region 558' and the display region 562'. During unfurling of the banner 104, the cradle 368' maintains the furled portion 128 in the cradle space 132' by gravity alone and without any structural connection between the freestanding exhibit display 100, 100' and the furled portion 128.

As the furled portion 128 is unfurled, the diameter 566' of the furled portion 128 is reduced to another diameter 572' (FIG. 27) that is less than the diameter 566' and less than the distance 570'. When the diameter of the furled portion 128 is less than the distance 570' (i.e. when the diameter of the furled portion is the diameter 572'), the furled portion 128 is pulled by gravity automatically from the unfurling region 558' into the display region 562', as shown in FIGS. 27 and 28. With the furled portion 128 in the display region 562' of the cradle space 132', the support bar 542' presses against the banner 104 to make the banner taut and the banner 104 is in a display configuration. In the display configuration, the banner 104 is substantially unfurled, such that less than 10% of the length of the banner 104 is included in the furled portion 128.

In some embodiments, a weighted stabilizer rod 574' (FIGS. 27 and 28) is placed in the cradle space 132' to inhibit movement of the furled portion 128 during display of the banner 104, but is not required in order to maintain the furled portion 128 in the cradle space 132' at any time. Like the cradle 368, there is no structural connection between the furled portion 128 and the cradle 368', and the cradle 368' maintains the furled portion 128 in the cradle space 132' by gravity alone.

Depending on the embodiment, the support bar 542' is adjusted to the lowered position when the furled portion 128 is in the display configuration by loosening the set screws 556', moving the support bar 542' downward toward the furled portion 128 in the vertical direction 564', and then tightening the set screws 556' to prevent further movement of the support bar 542'. In one embodiment, the support bar 542' pinches down on the furled portion 128 to impart a near constant tension across a full width of the banner 104, thereby resulting in a flatter banner 104 less prone to waves and other visual disruptions. In some embodiments, the weighted stabilizer rod 574' is used to impart even more tension in the banner 104. In other embodiments, the stabilizer rod 574' is not included and the support bar 542' is not moved to the lowered position when the furled portion 128 is in the display position, such that the support bar 542' is spaced apart from the furled portion 128 when the furled portion 128 is in the display position.

Figure 29A:
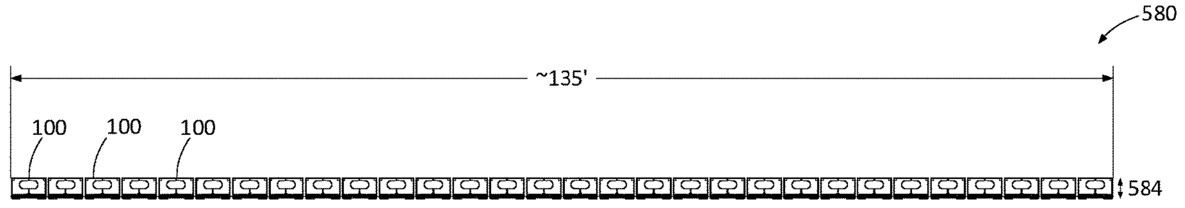
FIG. 29A is a top plan view of a plurality of the freestanding exhibit displays of FIG. 1 arranged in a combined display.
Figure 29B:
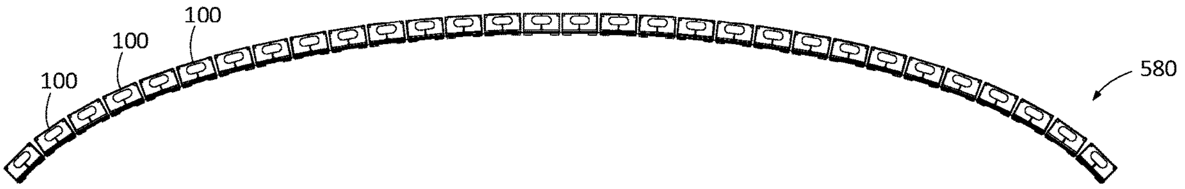
FIG. 29B is a top plan view of a plurality of the freestanding exhibit displays of FIG. 1 arranged in another combined display.
Figure 29C:
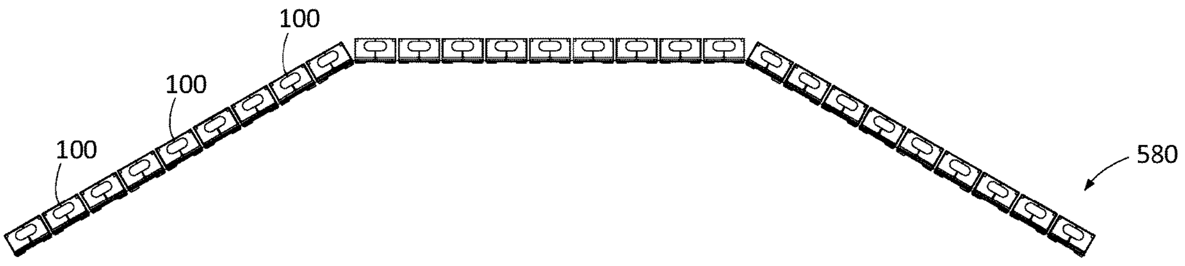
FIG. 29C is a top plan view of a plurality of the freestanding exhibit displays of FIG. 1 arranged in yet another combined display.
Figure 30A:
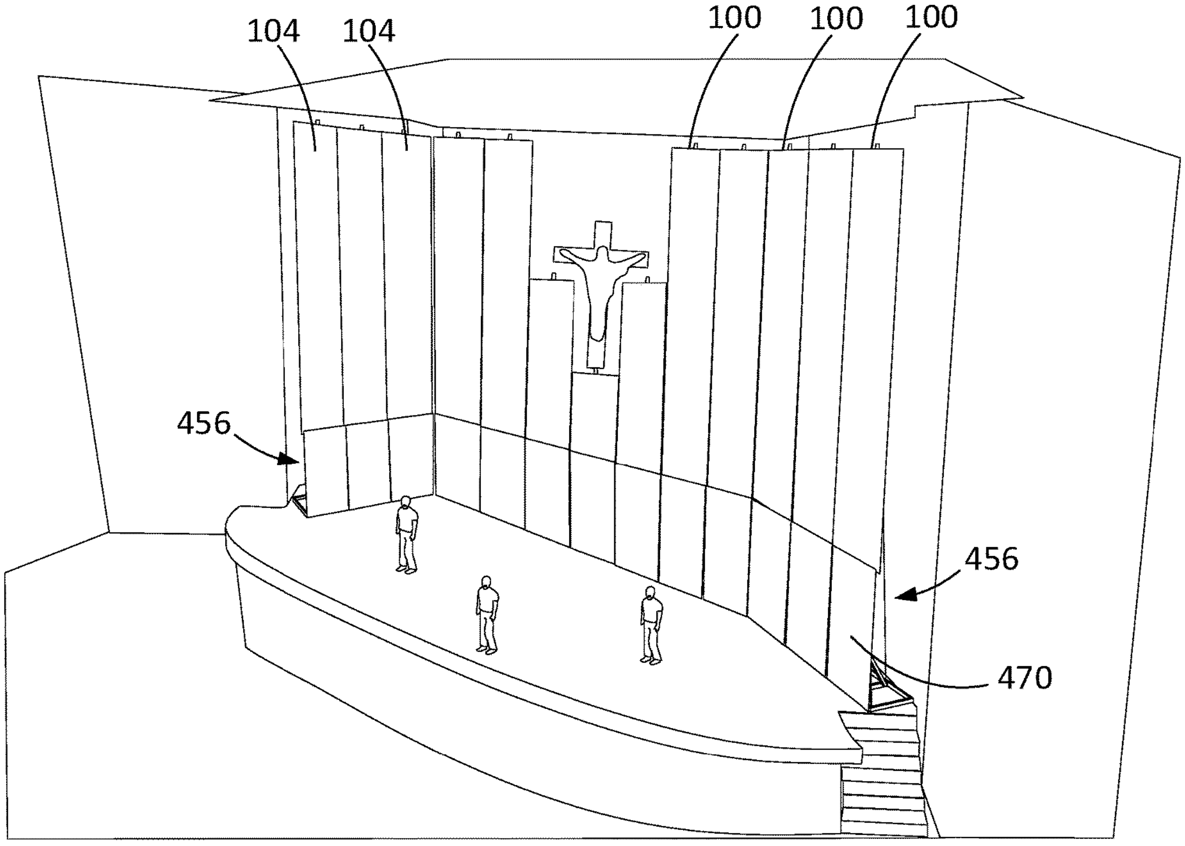
FIG. 30A is a perspective view of another combined display of at least the freestanding exhibit display of FIG. 1.
Figure 30B:
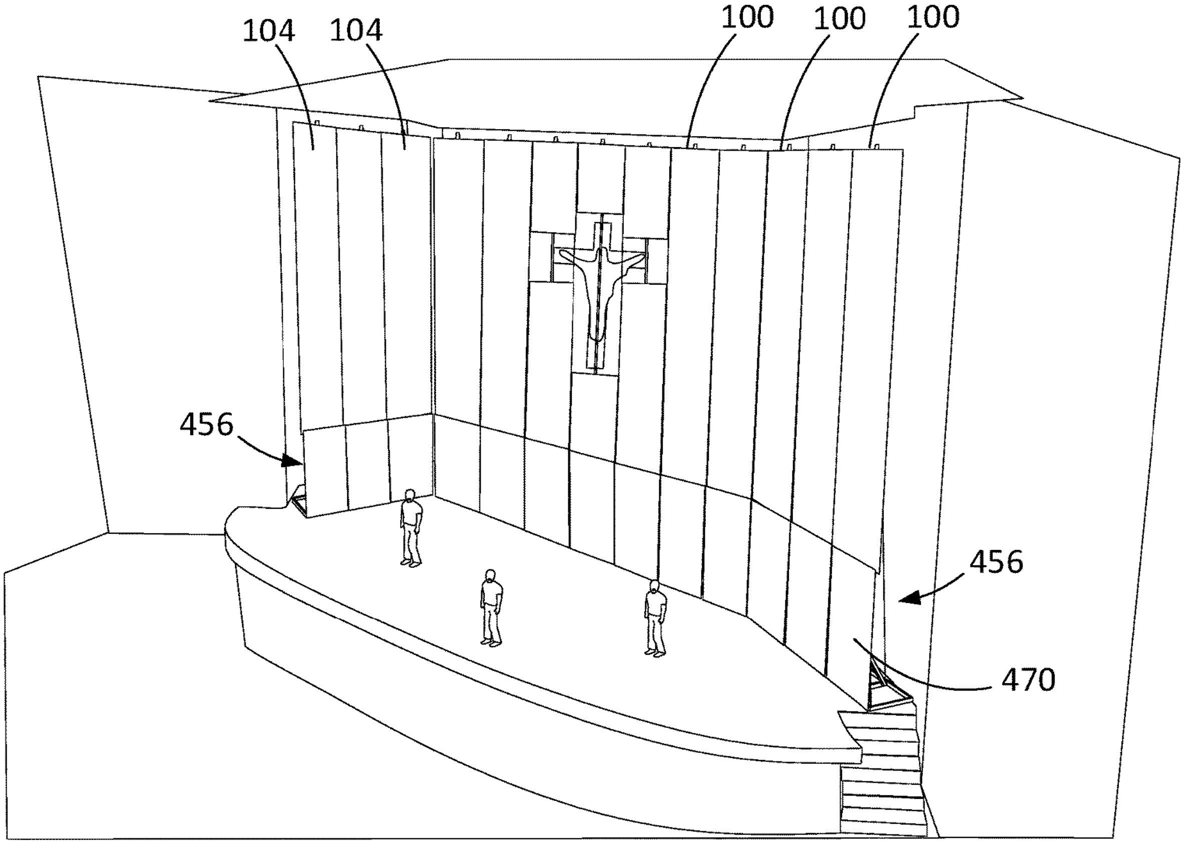
FIG. 30B is a perspective view of yet another combined display of at least the freestanding exhibit display of FIG. 1.

As shown in FIGS. 29A, 29B, 29C, 30A, and 30B multiple instances of the freestanding exhibit display 100 are placed next to each other to form a freestanding combined display 580. Unlike inflatable screens, the freestanding exhibit displays 100 are sectional to enable the combined display 580 to have any desired shape including, but not limited to, linear, parabolic, and trapezoidal. In FIG. 29A the freestanding exhibit displays 100 are configured in a linear arrangement having an approximate length of 135 feet. In FIG. 29B the freestanding exhibit displays 100 are configured in a curved (non-linear) arrangement. In FIG. 29C the freestanding exhibit displays 100 are configured in an angular arrangement having three linear portions. In FIG. 30A the freestanding exhibit displays 100 near the crucifix are configured with fewer upper sections 212 (FIG. 7) in the upright support structure 112 (FIG. 1) than the freestanding exhibit displays 100 spaced apart from the crucifix. In FIG. 30B, some of the freestanding exhibit displays 100 include the banner 456 shown in FIG. 23. In each of FIGS. 29A, 29B, 29C, 30A, and 30B, each freestanding exhibit display 100 is approximately forty feet tall and is erected by one person without any connection to the facility. Each configuration of multiple freestanding exhibit displays 100 is configured for use as a projector screen. Moreover, the configurations of multiple freestanding exhibit displays 100 have a narrow depth 584 (FIG. 29A) that occupies only a minimal amount of floor space. The optional curtain 470' (FIG. 20) is shown in this front-projection application to prevent seeing a shadow cast by the performers.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A freestanding exhibit display for supporting a banner, the exhibit display comprising:

a base;

an upright support structure extending from said base;

a transverse support arm mounted on said upright support structure and including a cradle defining a cradle space, said cradle configured to retain a furled portion of the banner in said cradle space with only gravity;

a cable connected to an unfurled portion of the banner; and a pulley mounted directly to a distal end portion of said upright support structure and configured to guide said cable, wherein said transverse support arm is located between said base and said pulley on said upright support structure.

2. The freestanding exhibit display of claim 1, further comprising:

a mounting bracket extending directly from said transverse support arm;

a winch system mounted directly on said mounting bracket, said winch system configured to retract said cable, wherein said pulley guides said cable from said winch system to the unfurled portion of the banner.

3. The freestanding exhibit display of claim 2, wherein said cradle is configured to enable the furled portion of the banner to rotate within said cradle space without exiting said cradle space during unfurling of the banner by said retraction of said cable by said winch system.

4. The freestanding exhibit display of claim 1, wherein said cradle retains the furled portion of the banner in said cradle space without any portion of said freestanding exhibit display being connected to the furled portion of the banner.

5. The freestanding exhibit display of claim 1, wherein:

said cradle includes a first cradle support structure spaced apart from a second cradle support structure, said upright support structure located directly between said first cradle support structure and said second cradle support structure, said first cradle support structure includes a first inclined support member defining a first support plane and a second inclined support member intersecting said first inclined support member and defining a second support plane, said second cradle support structure includes a third inclined support member defining a third support plane and a fourth inclined support member intersecting said third inclined support member and defining a fourth support plane, said third support plane is coplanar with said first support plane, and said second support plane is coplanar with said fourth support plane.

6. The freestanding exhibit display of claim 1, wherein:

the banner is a first banner, said cradle includes a banner connection structure configured to connect a second banner to said cradle, and said banner connection structure is configured to locate the second banner outside of said cradle space when the second banner is connected to said banner connection structure.

7. The freestanding exhibit display of claim 1, wherein said cradle includes:

a first upright arm member extending from said transverse support arm, a second upright arm member extending from said transverse support arm, and a support bar connected to said first upright arm member and to said second upright arm member, said support bar spaced apart from said transverse support arm, and defining a banner support surface configured to support the banner.

8. The freestanding support structure of claim 7, wherein:

said cradle includes (i) a first inclined support member extending from a first side of said transverse support arm, and (ii) a second inclined support member extending from said first side of said transverse support arm, the furled portion of the banner defines a first diameter when the banner is substantially furled in a storage configuration, the furled portion of the banner defines a second diameter when the banner is substantially unfurled in a display configuration, said first diameter is greater than said second diameter, said cradle space includes an unfurling region and a display region, a minimum distance between said support bar and said first inclined support member is less than said first diameter and is greater than said second diameter, said minimum distance is located at a boundary of said unfurling region and said display region, and said cradle is configured to cause the furled portion of the banner to move from said unfurling region to said display region automatically during unfurling of the banner.

9. The freestanding exhibit display of claim 1, further comprising:

a lighting support structure mounted on said upright support structure, said lighting support structure defining at least one mounting point configured to receive a light emitting unit, wherein said transverse support arm is located between said base and said lighting support structure on said upright support structure.

10. A freestanding exhibit display for supporting a banner, the exhibit display comprising:

a base;

an upright support structure extending from said base;

a transverse support arm mounted on said upright support structure; and a cradle fixedly connected directly to said transverse support arm and defining a cradle space, said cradle configured to retain a furled portion of the banner in said cradle space with only gravity, wherein said transverse support arm is movable relative to said upright support structure along a vertical adjustment range, and wherein said transverse support arm and said cradle are fixedly positionable in a selected vertical position along said vertical adjustment range.

11. A freestanding exhibit display for supporting a banner, the exhibit display comprising:

a base;

an upright support structure extending from said base;

a transverse support arm mounted on said upright support structure and including a cradle defining a cradle space, said cradle configured to inhibit a center of mass of a furled portion of the banner from moving to a position that causes the furled portion to exit said cradle space during unfurling of the banner;

a cable connected to an unfurled portion the banner; and a pulley mounted directly to a distal end portion of said upright support structure and configured to guide said cable, wherein said transverse support arm is located between said base and said pulley on said upright support structure, and wherein said freestanding exhibit display is completely disconnected from the furled portion of the banner, such that the furled portion is freely removable from said cradle space.

12. The freestanding exhibit display of claim 11, further comprising:

a mounting bracket extending directly from said transverse support arm;

a winch system mounted directly on said mounting bracket, said winch system configured to retract said cable, wherein said pulley guides said cable from said winch system to the unfurled portion of the banner.

13. The freestanding exhibit display of claim 12, wherein said cradle is configured to enable the furled portion of the banner to rotate within said cradle space without exiting said cradle space during unfurling of the banner by said retraction of said cable by said winch system.

14. The freestanding exhibit display of claim 13, wherein said cradle is configured so that the furled portion is freely removable from said cradle space without configuration or manipulation of said exhibit display.

15. The freestanding exhibit display of claim 11, wherein:

said cradle includes a first cradle support structure spaced apart from a second cradle support structure, said upright support structure located directly between said first cradle support structure and said second cradle support structure, said first cradle support structure includes a first inclined support member defining a first support plane and a second inclined support member intersecting said first inclined support member and defining a second support plane, said second cradle support structure includes a third inclined support member defining a third support plane and a fourth inclined support member intersecting said third inclined support member and defining a fourth support plane, said third support plane is coplanar with said first support plane, and said second support plane is coplanar with said fourth support plane.

16. The freestanding exhibit display of claim 11, wherein:

the banner is a first banner, said cradle includes a banner connection structure configured to connect a second banner to said cradle, and said banner connection structure is configured to locate the second banner outside of said cradle space when the second banner is connected to said banner connection structure.

17. The freestanding exhibit display of claim 11, wherein said cradle includes:

a first upright arm member extending from said transverse support arm, a second upright arm member extending from said transverse support arm, and a support bar fixedly connected to said first upright arm member and to said second upright arm member, said support bar spaced apart from said transverse support arm.

18. The freestanding support structure of claim 17, wherein:

said cradle includes (i) a first inclined support member extending from a first side of said transverse support arm, and (ii) a second inclined support member extending from said first side of said transverse support arm, the furled portion of the banner defines a first diameter when the banner is substantially furled in a storage configuration, the furled portion of the banner defines a second diameter when the banner is substantially unfurled in a display configuration, said first diameter is greater than said second diameter, said cradle space includes an unfurling region and a display region, a minimum distance between said support bar and said first inclined support member is less than said first diameter and is greater than said second diameter, said minimum distance is located at a boundary of said unfurling region and said display region, and the cradle is configured to cause the furled portion of the banner to move from said unfurling region to said display region automatically during unfurling of the banner.

19. The freestanding exhibit display of claim 11, wherein:

said transverse support arm is movable relative to said upright support structure along a vertical adjustment range, and said transverse support arm is fixedly positionable in a selected vertical position along said vertical adjustment range.

20. The freestanding exhibit display of claim 11, further comprising:

a lighting support structure mounted on said upright support structure, said lighting support structure defining at least one mounting point configured to receive a light emitting unit, wherein said transverse support arm is located between said base and said lighting support structure on said upright support structure.

* * * * *